June 9, 1964 A. SAFIR 3,136,839

APPARATUS FOR OBJECTIVELY TESTING AN OPTICAL SYSTEM

Filed Sept. 16, 1958 7 Sheets-Sheet 1

INVENTOR.
ARAN SAFIR

BY
Morgan, Finnegan, Durham & Pine
ATTORNEYS.

INVENTOR.
ARAN SAFIR
BY
Morgan, Finnegan, Durham & Pine
ATTORNEYS.

APPARATUS FOR OBJECTIVELY TESTING AN OPTICAL SYSTEM

Filed Sept. 16, 1958

7 Sheets-Sheet 3

INVENTOR.
ARAN SAFIR
BY
Morgan, Finnegan, Durham & Pine
ATTORNEYS.

INVENTOR.
ARAN SAFIR
BY
Morgan, Finnegan, Durham & Pine
ATTORNEYS

INVENTOR.
ARAN SAFIR
BY
Morgan, Finnegan, Durham & Pine
ATTORNEYS.

June 9, 1964 A. SAFIR 3,136,839

APPARATUS FOR OBJECTIVELY TESTING AN OPTICAL SYSTEM

Filed Sept. 16, 1958 7 Sheets-Sheet 6

INVENTOR.
ARAN SAFIR

BY
Morgan, Finnegan, Durham & Pine
ATTORNEYS.

INVENTOR.
ARAN SAFIR
BY
Morgan, Finnegan, Durham & Pine
ATTORNEYS.

United States Patent Office 3,136,839

Patented June 9, 1964

3,136,839

APPARATUS FOR OBJECTIVELY TESTING AN OPTICAL SYSTEM

Aran Safir, 218 2nd Ave., New York, N.Y.

Filed Sept. 16, 1958, Ser. No. 761,421

11 Claims. (Cl. 88—56)

This invention relates to apparatus for testing and measuring optical elements and more particularly to the objective testing and measurement of the refractive properties and related characteristics of organic and inorganic lenses.

The invention will be described principally in terms of its application to the testing of the eye, for it is in this mode of operation that the invention meets its greatest challenge and makes its greatest contribution.

Since the invention embraces several distinct arts and technologies, a thorough understanding of its principles and structures may require reference to several specialized fields including electronics, optics and ophthalmology.

The eye can be treated in certain respects as a lens system having variable optical characteristics including focal length and aperture. This basic analogy has given rise to the application of many techniques and apparatus found in the art and science of optics to the testing, diagnosis, and treatment of the eye. Ophthalmologists have brought to bear, in solving certain problems associated with the eye, many of the modern techniques and tools originating in the field of optics. This approach has been tempered of course with the realization that the analogy between the eye and the analogous lens system is a limited one. Profound subjective considerations, identified with the eye in its role as a human organ, complicate and confuse the seemingly straightforward problem of measuring ocular characteristics. Actually the eye proper is a mere (although extraordinarily complicated) transducer. While the eye itself performs certain computations, the sensation of seeing, which is as much a mystery as it is a wonder, involves considerably more than the eye per se; functions attributed to sections of the brain, to the optic nerve and to other relatively unknown structures play significant interdependent roles. Experience, attitude, training and a host of other intangibles are also related to the sensation of "seeing."

Compounding these difficulties are certain structural and physical problems. The eye is relatively inaccessible and delicate. It is also quite varied and unpredictable in its characteristics: one human is myopic, another hyperopic; one has a severe cataract, another has a clear transparent cornea and lens. In sensitivity and response to the wavelength of impinging energy the characteristics of the eye are similarly varied.

In actual practice the problem of evaluating ocular characteristics is a substantial one. Ophthalmologists, in recognition of this, are cautious and circumspect in applying the techniques and tools associated with inanimate optical systems to the diagnosis and treatment of the eye. They do however make use of several basic optical instruments which are described briefly below.

One well-known technique applicable to the testing of the eye involves the use of an ophthalmoscope. With this instrument a view of accessible surfaces within the eye is possible. The observer is able to view, for example, regions of the retina through the cornea, aqueous humor and lens. A source of illumination and lens system embodied in the ophthalmoscope serve to achieve this function.

While the principal function of the ophthalmoscope is directed to a visual observation of the condition of the retina and intervening media, certain of these instruments can serve in an ancillary capacity as an indicator of the refractive conditon of the subject's eye. This function follows from the operation of adjusting the ophthalmoscope lens system to bring the subject's retina into focus. The degree of this adjustment is dependent on the refractive status of the patient's eye and is thus a measure of this refractive condition.

The use of an ophthalmoscope for determining refractive errors is limited by substantial disadvantages including the disturbing proximity of the instrument to the patient's eye. With the instrument close to the patient there is a tendency for him to accommodate, i.e. tense the ciliary muscle to shorten the focal length. This action is undesirable since the measurement of the refractive condition of the eye is generally referred to the eye in the unaccommodated state, i.e., with the ciliary muscle relaxed as when gazing toward infiinity.

Other difficulties burden refractive measurement with the ophthalmoscope: the general system dimensions are not optimum from the viewpoint of accurate refraction; observation is annoyed by spurious reflections from the cornea of the patient unless certain salient spatial relations are obtained; additionally, the measurement is subjectively evaluated thereby introducing, for example, the unknown variable associated with the observer's accommodation; considerable uncertainty in the results thus occurs. Finally the measurement of refraction along various axes or meridians of the eye, performed to disclose astigmatic conditions, would entail impractical scanning with and adjustment of the ophthalmoscope. These and related disadvantages have discouraged the use of the ophthalmoscope for refractive measurements and have led the ophthalmologist to seek a better technique. One such improved technique lies in retinoscopy.

Retinoscopy is often described as the best method of objectively determining the refractive condition of the eye. The term "objectively" refers here to the method of testing wherein the subject's appraisal of the test results is not essential to the measurement. The testing is subjective in that the observer subjectively evaluates the results.

Retinoscopy describes the art and science of evaluating the refractive conditions of the eye with the help of a retinoscope. A retinoscope is basically a light source which generates a beam of light, not unlike the popular little pen-lights, with the light beam generated in such a manner as to permit the observer to look down the beam axis toward whatever is illuminated.

The retinoscopist points the retinoscope's beam of light toward the subject's pupil, views the pupil by looking down the beam axis through an aperture, and watches for a "reflex" action.

This "reflex" action appears as an illumination of the pupil—the subject's pupil appears to be alternately illuminated and darkened as the beam of light from the retinoscope is swept across the pupil. This is not direct illumination of the pupil by the incident light beam—what the observer is actually viewing when he sees the pupil illuminated are rays of light reflected from the subject's retina back through the pupil to the observer. The characteristics of this reflex action, i.e. the way in which the pupil is illuminated and darkened, enable the retinoscopist in the usual case to determine whether the patient is emmetropic, myopic or hyperopic and, in the latter cases, the degree of ametropia.

While the retinoscope is widely used in ophthalmology it should be noted that retinoscopy is a relatively crude technique. A reflex action which provides a reasonably valid indication of the refractive condition of the patient's eye is not always easy to achieve.

In retinoscopy it is desired for certain testing that the subject's eye be unaccommodated. Attempts are made to insure this condition but he of course may be focusing on the retinoscope. Additionally, the retinoscope is handmanipulated and proper use is thus dependent on operator skill in properly illuminating the subject's retina. Additional difficulties involve evaluation of the resultant reflex. This evaluation is demanding, requiring considerable skill and patience. It is thus seen that retinoscopy is not really "objective" because subjective appraisal of the reflex is necessary. In short, all the limitations necessarily found in the use of a manually operated tool and found in the subjective evaluation of the results, inhere in retinoscopy.

In addition to the ophthalmoscope and retinoscope there are other instruments which provide data related to refractive conditions of the eye, including the Keratometer, an optical instrument which measures the curvature of the cornea, and several types of optometers.

Notwithstanding the availability of these instruments, the final and controlling test in the usual refractive measurement of the eye is a subjective one—the subject views some target through various lenses and lens combinations until he decides when the image is clearest. Of course a serious discrepancy between the patient's choice and the ophthalmologist's estimate, as based for example on retinoscopic examination, will indicate that additional testing is in order.

The instruments described hereinbefore are infected with certain common and basic limitations: they are manually adjusted and operated thus demanding operator skill; their use requires a sometimes disturbing closeness of patient, instrument and observer, thus demanding a great deal of cooperation; the results are subjectively evaluated thereby demanding substantial observational skill and frequently requiring considerable time.

These disadvantages are overcome with the present invention which provides automatic measurement of the refractive properties of the eye and inanimate lens systems. This is generally accomplished by periodically scanning the subject lens with radiant energy, detecting the resultant reflex with photosensitive apparatus, and evaluating the detected reflex with electronic and related elements.

It is thus an object of the invention to provide a device which measures refractive and related properties without the need for substantial operator skill.

It is an additional object of the invention to measure ocular and inorganic lens characteristics at a speed and with a degree of thoroughness and accuracy not attainable by subjective appraisal.

It is a further object of the invention to provide measurement of refractive properties in a substantially automatic manner without the need for intervention by an operator and without the need for skillful interpretation and evaluation.

It is another object of the invention to provide ocular testing wherein the state of the subject can be more precisely controlled and predicted.

A still further object of the invention is to provide ocular testing wherein the disturbing effects on the subject of the test instruments and test procedure are minimized.

A further object of the invention relating to inorganic lenses is to provide automatic and continuous measurement of lens properties in such a way as to provide continuous data for monitoring or control purposes, e.g. in automatic lens positioning or automatic lens grinding functions.

Other objects and advantages of the invention will be set forth in part hereinafter and in part will be obvious herefrom, or may be learned by practice with the invention, the same being realized and attained by means of the instrumentalities and combinations pointed out in the appended claims.

Several structures embodying the principles of the invention will be described herein. These are intended to be exemplary since manifold variations are possible. By way of illustrating the teachings of the invention reference may be had to the accompanying drawings wherein FIGURE 1 is a sectional and schematic drawing illustrating the illumination of the subject's retina;

Figure 1:
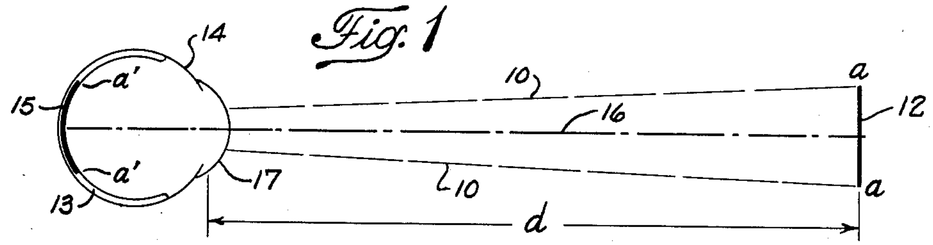

In FIGURE 1 a beam of light 10 is shown which emanates from a source 12 located in position *a—a* relative to the visual axis 16. For simplicity, the visual and optical axes will be assumed coincident. The beam causes illumination of the retina 13 of eye 14. If the eye 14 accommodates so as to focus on the source 12, located at distance *d*, then an image 15 of the source will be focused on the retina 13 at the position *a′—a′*.

Figure 2:
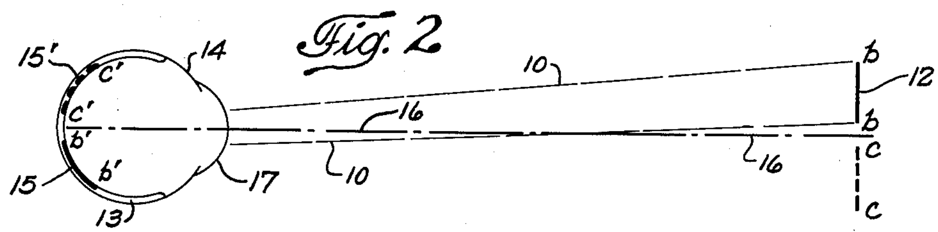
FIGURE 2 is a similar drawing illustrating the effect of moving the source of illumination.

Assume now that the source 12 has been moved in an upward direction to the point *b—b* as shown in FIGURE 2. With the original conditions otherwise undisturbed, an image 15 of the source 12 will now appear on the retina 13 below the axis 16 of the eye 14, at position *b′—b′*.

Again, if the source 12 is moved in a downward direction to the point *c—c*, indicated in FIGURE 2, the image 15′ will appear on the retina 13 at position *c′—c′*.

At this point it is appropriate to inquire: What will an observer, viewing the pupil 17, of eye 14, see as the source 12 is moved? The answer depends in part on the position of the observer.

Figure 3:
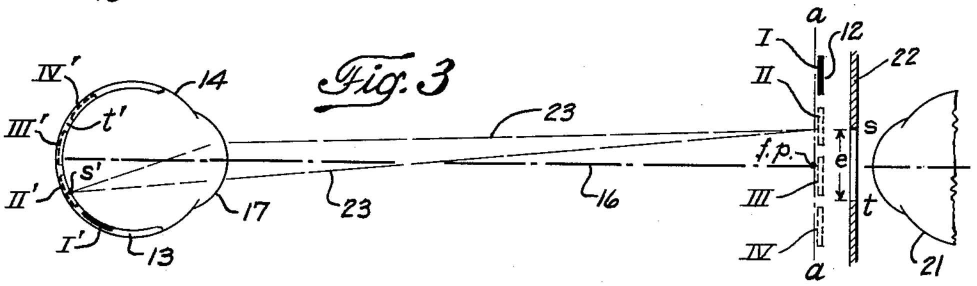
FIGURE 3 is a sectional and schematic drawing of the patient's eye, the observer's eye and the source of illumination.

In FIGURE 3, eye 14 with focal plane at *a—a*, is illuminated by source 12. For illustration it will be assumed that source 12 can be moved through successive positions I, II, III and IV thus causing illumination of successive areas I′, II′, III′ and IV′ of retina 13. Of course positions intermediate I′, II′ etc. will be illuminated as source 12 "scans" the retina but for illustrative purposes only the specified positions will be considered.

Located near the axis 16 of eye 14 is the eye 21 of the observer, so oriented as to view the pupil 17 of the subject's eye. A stop 22 is interposed in front of the observer's eye 21 so as to limit his field of view (his own pupil does this, but for illustration the external stop 22 will be considered).

Because of the stop 22 the observer, although capable of viewing the entire pupil 17 of the subject's eye, can only see the pupil by virtue of the rays reflected from that portion of the pupil's retina designated $s'$—$t'$. Rays from other regions of the retina will not pass through the aperture of stop 22. The size and location of the region $s'$—$t'$ is determined by considering the projection of the aperture of stop 22 on the subject's retina. Thus if any section of the region $s'$—$t'$ is illuminated, as for example, when light source 12 is somewhere in the region $s$—$t$ in plane $a$—$a$, the observer will note that the entire pupil 17 appears to be illuminated because each illuminated point in the region $s'$—$t'$ of the retina 13 transmits light through the entire pupil 17, the retina being a diffuse reflector. Dashed lines 23 illustrate this condition whereby illumination of the point $s'$ results in reflected rays being transmitted through all regions of the pupil 17 to the observer 21. The illumination of the pupil in this manner appears to the observer somewhat like that of the luminosity in darkness of the eyes of certain animals, for example, those of the feline family.

To better understand the function of the stop it is convenient to assume that the image of the subject's retina falls in a certain plane. The position of this plane, $a$—$a$ in FIGURE 3, corresponds to the point-of-focus of the eye; for the eye which is in the unaccommodated or relaxed state this plane contains a point on the visual axis which is termed the punctum remotum or far point of the eye. The position of the punctum remotum of an emmetropic eye is theoretically located at an infinite distance from the subject's eye.

With the retina imaged on a plane, e.g. plane $a$—$a$ of FIGURE 3, it is possible to locate discrete sections of the retina by confining observation to discrete sections of the plane. This is one function of the stop, either the stop 22 of FIGURE 3 or the inherent stop of the observer's eye. The stop limits observation to a specific section of the plane containing the image of the retina and therefore limits observation to discrete regions of the retina. If illumination falls on the retina within the region defined and selected by the stop then the reflected rays will be visible to the observer and if the observer is in the plane containing the image of the retina, these rays will appear to come from all parts of the pupil.

The apparent brightness of the pupil 17 as observed by eye 21 will depend, for a given intensity of incident light from source 12, on the size of the area in region $s'$—$t'$ which is illuminated, this brightness being maximum when the entire region $s'$—$t'$ is illuminated. The region $s'$—$t'$ is termed the ophthalmoscopic field of vision (which shall be designated OFV to facilitate explanation).

The area of the OFV has been shown to depend on the size of the stop 22 (or observer's pupil). It also depends on the distance from the stop to the subject's pupil. The OFV can thus be considered as the projection of the observer's field of view, defined by the external stop or his own ocular dimensions, on the subject's retina. It will depend not only on the size of stop 22 and the distance $d$, but also, as shown later, on the position of the observer and stop relative to the plane of the punctum remotum. These factors will be discussed in more detail subsequently.

If illumination of any point in the OFV region, $s'$—$t'$, causes illumination from the observer's view, then it should be evident that with source 12 in the positions II and III, pupil 17 will appear illuminated since regions II' and III' which fall wholly or partially in the region $s'$—$t'$, are illuminated. The apparent illumination with the source 12 in position III will be greater than the illumination occurring when source 12 is in region II since region III' is entirely within the OFV. It is also evident at this point that the size of the source of illumination, 12, effects the degree of observed brightness.

While the entire pupil 17 appears illuminated in positions II and III of source 12 it is clear that it will appear entirely devoid of illumination from retina 13 and will thus appear dark when the source is in positions I and IV; in these positions the source causes illumination of regions I' and IV', both of which lie outside the OFV. It can therefore be said that the pupil 17 exhibits an ON-OFF reflex condition, i.e., is entirely illuminated or entirely dark (except for specular reflections described hereinafter). No partial illumination of the pupil occurs. This ON-OFF reflex obtains when (1) the observer's eye lies in the focal plane of subject's eye, i.e., in the plane of the punctum remotum, (2) the OFV is smaller than the total scanned area of the subject's retina, i.e., the incident illumination scans areas within and without the OFV, and (3) the illumination field 12 is sufficiently small so as to be able to illuminate a region of the retina which is completely outside the OFV, thus creating the OFF condition.

Reference to FIGURE 3 can be made again to determine some additional salient geometric factors. As noted hereinbefore the OFV region, $s'$—$t'$, is dependent on the diameter, $e$, of the stop 22. Making this diameter small causes a corresponding decrease in the size of OFV region $s'$—$t'$ thus permitting a smaller sweep of illumination and still insuring an ON-OFF reflex. However, too small a diameter creates interference problems, causes a reduction in the observed illumination of pupil 17, and produces other complications. Just as the size of the OFV region affects the required degree of sweep so also will the size of the illumination field 12. Further, if the area of the illumination field is small relative to the size of the OFV region $s'$—$t'$, the change in degree of observed illumination as the OFV region is swept by illumination will be small. Of course control over the size of the illumination presupposes a knowledge which is not initially available. In this connection it should be emphasized that the configuration described in FIGURES 1–3 is somewhat idealized. Dimensioning has been distorted for illustrative purposes.

The effective movement of light source 12 can be accomplished by numerous methods including many lamp-reflector combinations wherein the real or virtual image of the source 12 can be displaced. The source 12 in most cases will not lie in the focal plane of the eye 14. The far point, f.p., in the focal plane $a$—$a$ of FIGURE 3 is, for the emmetropic eye, at infinity; for the myopic eye the far point is at some distance from the eye, 14, less than infinity, and for the hyperopic eye the far point is behind the retina. Thus the far point can vary over a tremendous range from an arbitrarily large distance in front of the retina to a substantial distance behind the retina. It is thus seen that the source 12 would not in general coincide with the far point of the eye. The general results described in connection with FIGURES 1–3 are not impaired however—the effect of the source 12 is still to illuminate the retina, the illuminated section will have a size and be more or less sharp and brilliant in accordance with the distance of the source from the far point. The basic conclusion is: if the observer is located at the far point of the subject's eye—and because the observer must be at some practical distance from the subject this may entail the use of a working lens to place the far point at a convenient distance, then he will observe the alternate illumination and darkness of the entire pupil as the light source is moved—no partial illumination of the pupil will occur. It is the reflex which is observed when the observer's position corresponds with the subject's punctum remotum. Note that the reflex is of an ON-OFF nature so far as totality of pupil illumination is concerned; but is not bivalued in so far as the magnitude of illumination is concerned; this parameter varies with the degree of illumination of the OFV.

Figures 4, 5:
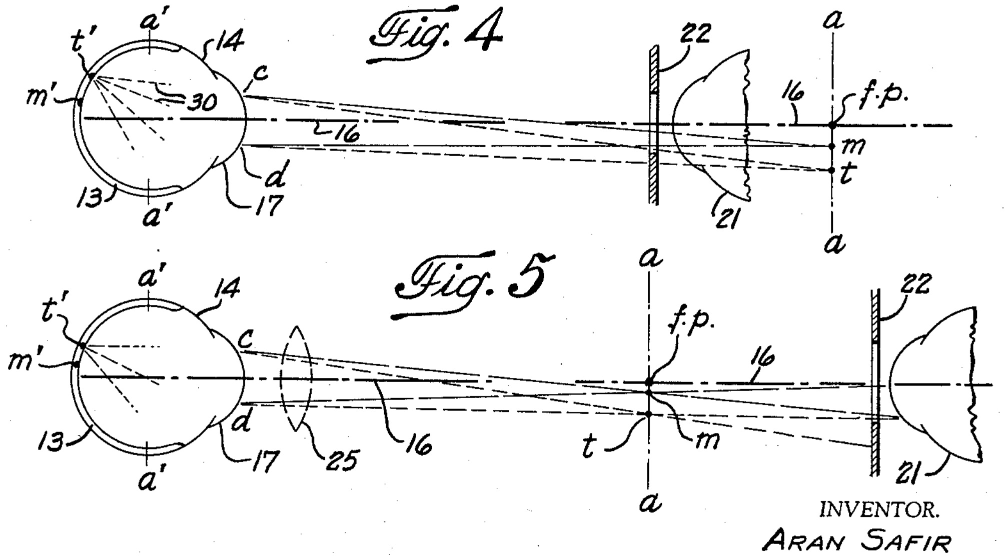
FIGURE 4 is a similar drawing illustrating a change in the system dimensions.
FIGURE 5 is a similar drawing illustrating another change in the system dimensions.

In FIGURE 4, the subject's eye 14 is assumed to be in the same state as its counterpart in FIGURE 3, i.e., the far point, f.p., lies in the plane $a$—$a$ and regions of the retina 13 are successively illuminated by a moving light source. For convenience the source is not shown. Unlike the condition in FIGURE 3, the observer's eye 21 and stop 22 do not correspond with the subject's far point, f.p. To demonstrate the effect of moving the observer away from the punctum remotum certain significant points have been identified in FIGURE 4. The points *c—d* represent the top and bottom boundaries of the pupil. From point *c* a ray is represented which intercepts the lower edge of stop 22; this ray has been extended to the point *t* in the plane of the punctum remotum or far point. The corresponding point on the retina is identified at *t'*. It is apparent that if *t'* is illuminated then rays emanating from this point will pass through all sections of the pupil 17, the borderline rays of this group being shown by the previously identified ray *c—t* and by the ray *d—t*. Although rays originating at *t'* pass through all sections of the pupil 17, it is apparent from the figure that only the ray *c—t* will be intercepted by the observer's eye 21; all rays below *c—t* will be out of the field of view of observer 21. Thus when the point *t'* on the retina is illuminated, the observer sees a partial illumination, in this case, just the border, of the pupil. As the illumination sweeps down the retina past point *t'*, a successively greater area of illumination of the pupil 17 is observed until finally, at point *m'*, the entire pupil is illuminated. Note from the figure that rays originating at *m'* and passing through every section of the pupil are intercepted by the observer thus causing the entire pupil to appear illuminated.

Thus when the observer moves away from the punctum remotum the reflex loses its bi-valued characteristic—partial illumination of the pupil is observed and as radiation scans the retina from outside the OFV a sequence is noted which commences with total darkness, followed by illumination of increasing sections of the pupil until total illumination of the pupil is observed; the remaining sequence is symmetrical with the first described and terminates in total darkness of the subject's pupil.

It should also be noted in connection with the response to the conditions established in FIGURE 4 that the apparent movement of the illuminated region of the subject's pupil is significant. As the illumination scans the region of the retina from *t'* to *m'*, the apparent motion of the illuminated section of the pupil was from *c* to *d*. If it is assumed that the light source was positioned by rotating a plane mirror which reflects illumination into the pupil then a downward rotation of the mirror (which produces an apparent upward movement of the source) would produce a downward sweep of illumination on the retina, e.g. from *t'* to *m'*. It is therefore apparent that as the mirror moves down, the observed illumination of the pupil moves down (from *c* to *d*). This is called a "with movement" and is the characteristic reflex when the punctum remotum lies outside the interval between the subject and the observer's pupil, i.e. when relative hyperopia prevails. It will be shown below that an opposite or "against movement" characterizes the reflex when the punctum remotum lies in the interval between the subject and observer's pupil, i.e. when relative myopia prevails. The term "relative" is here used to signify that the observed results depend on the position of the observer relative to the punctum remotum. Of course these reflexes become interchanged if the light source is used as the reference but retinoscopists customarily use the movement of the mirror or incident beam as the reference since these motions are readily perceived. To be consistent the conditions assumed with respect to FIGURE 4 will be associated with a "with movement." For a description of the conditions associated with an "against movement" reference may be had to FIGURE 5.

FIGURE 5 differs from FIGURE 4 in one basic respect: the punctum remotum lies within the interval bounded by the subject and the observer's eye 21. As noted before, the punctum remotum of an emmetropic eye is located at infinity so certain practical difficulties attend the stationing of the observer beyond the far point.

To obviate this difficulty a working lens 25 is often employed to bring the punctum remotum to a practical working distance. A working lens can be used for emmetropic and ametropic eyes to place the punctum remotum at some convenient distance.

Conditions of illumination in FIGURE 5 are assumed similar to those described with respect to FIGURE 4. Note that illumination of the point *m'* on the retina, corresponding to point *m* in the plane of the punctum remotum, causes total illumination of pupil 17—rays *c—m* and *d—m* are both visible to the observer. Point *m'* represents one point on the border of the ophthalmoscopic field of view. Note further that partial illumination just commences with illumination of the point *t'*, only the ray *d—t* is visible to the observer. To this extent conditions as described in connection with FIGURE 4 still prevail: when retinal illumination arrives at point *t'* a partial illumination of the pupil 17 commences; the illuminated area grows in size until, with illumination of point *m'*, total illumination of pupil 17 occurs. However, in FIGURE 4 the first ray visible to the observer at the threshold of illumination emanated from the top of the pupil 17 and was identified as ray *c—t*. In FIGURE 5 the first ray visible to the observer is represented by line *d—t* which passes through the bottom of the pupil. The illuminated region of the pupil 17 in the present case thus appears to move up; the movement of the mirror—since the source appears to move up to provide a downward sweep of the retinal illumination from *t'* to *m'*—is down. Thus, an "against movement" characterizes the response. This is the case when the punctum remotum is between the observer and the subject.

It is appropriate at this point to emphasize that since the "with" and "against" movements characterize the nature of the refractive condition, the observer must take into consideration the type of optical system utilized for scanning the retina. If a mirror is not used then some other convenient reference must be adopted. If certain concave mirrors rather than a plane mirror are used the reflexes will be interchanged.

Figure 6:
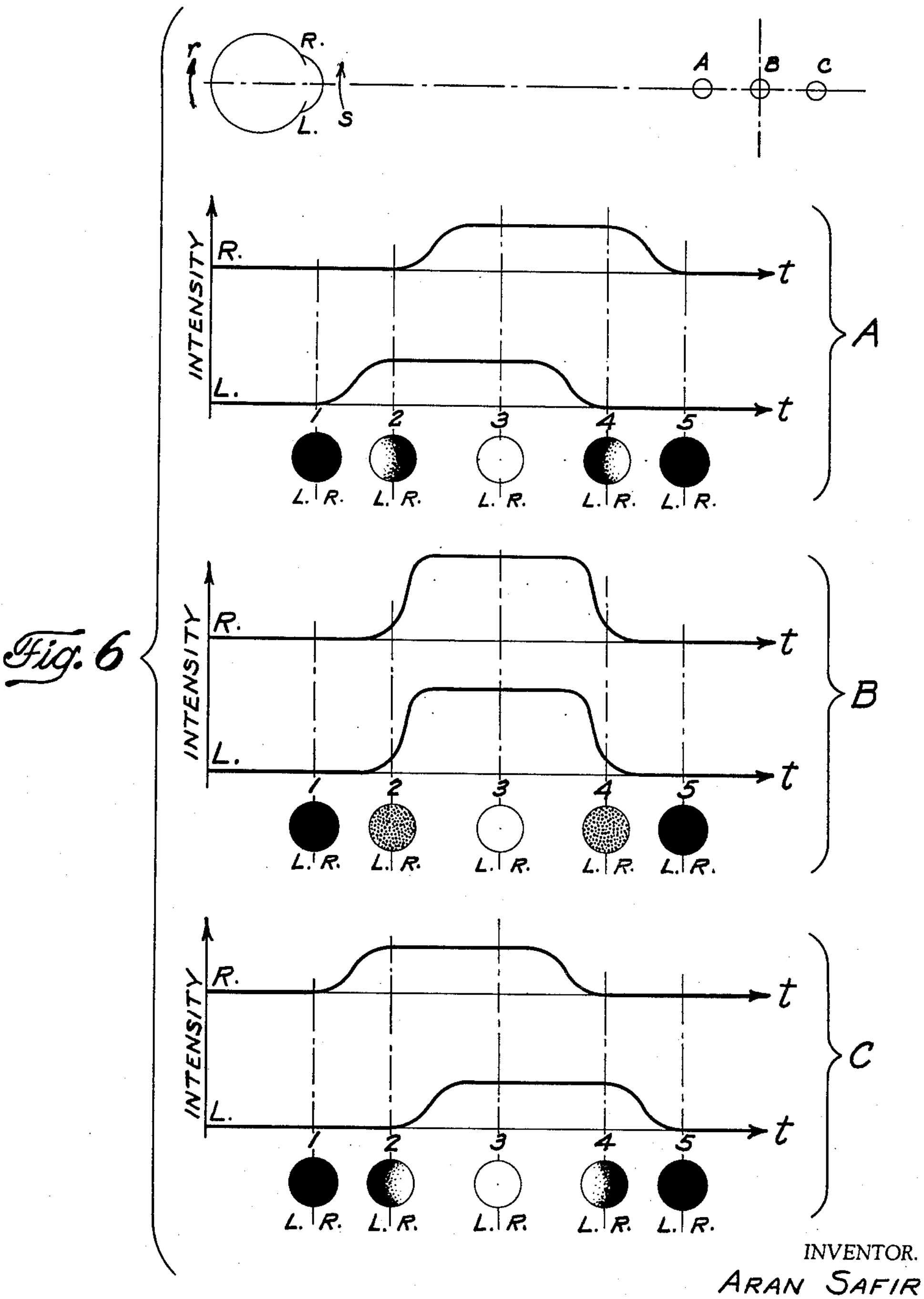
FIGURE 6 is a schematic drawing of various reflex characteristics.

To illustrate the response observed as one varies his position relative to the subject's punctum remotum reference may be had to FIGURE 6. Illustrated in this figure are the variation in pupil illumination for three conditions. In set A, the observer is at position A. The punctum remotum is at point B and the light source and mirror are located such that the direction of rotation of the mirror and incident illumination is as depicted by the arrow *s* while the direction of scan of the illuminated retinal patch is as indicated by arrow *r*. For illustration, the pupil has been segmented into left and right semi-circles, L and R. Note that in position A, a "with movement" of the illuminated region of the pupil is observed. As the light beam scans in the direction *s*, from left to right, the apparent illumination of the pupil, shown by the unshaded regions of the pupils, appears also to move from left to right during the scan intervals $t1$, $t2$ . . . $t5$. An approximate plot of the illumination variation in the left and right sections of the pupil is also depicted. These plots also illustrate the fact that the illumination of the left section L leads, in time, the illumination of the right section R.

In position B the observer is stationed at the punctum remotum and the "point-of-reversal" reflex occurs. No partial illumination of the pupil exists as is evidenced by equal illumination of the left and right sections. Note that while partial illumination does not occur, there is a variation in the magnitude of the illumination over the range of scan. It should also be noted that the average level of illumination is increased over that shown in connection with condition A.

In position C the observer is beyond the punctum remotum. An "against movement" occurs, the illuminated region moving in a direction opposite to that of the scan. Note the corresponding time lead in the illumination response of the right section R relative to the left section L and the decrease in average illumination.

Before proceeding it should be observed that certain limitations and simplifying assumptions have been made in order to facilitate explanation. For example, an ideal optical eye has been assumed; aberrations have been ignored and spurious reflections have not been considered. These factors frequently distort the above responses. Additionally, refraction along only one axis or meridian of the eye has been treated, thus avoiding the problem of astigmatism. These considerations will be included subsequently.

It should also be noted before proceeding that the speed of the reflex, i.e., the speed at which illumination travels across the pupil varies from some finite value in one direction for one polarity of refractive power through an infinite speed at the point-of-reversal and thence to a finite value in the opposite direction for the opposite polarity of refractive power. It is thus seen that speed, intensity and direction all characterize the reflex.

*A Basic Ocular Testing Configuration*

Figure 7:
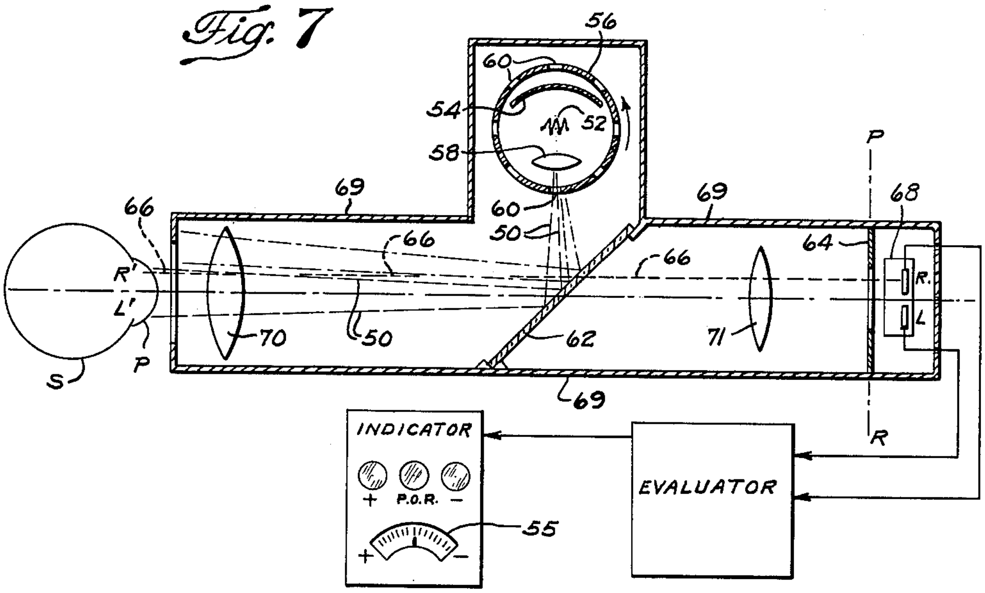
FIGURE 7 is a sectional and schematic view of one general embodiment of the invention.

One basic arrangement for providing objective evaluation of the reflex is illustrated in FIG. 7.

Shown in the figure is the subject's eye S, the pupil P, of which receives a beam of radiant energy 50. Beam 50 originates in the source 52, illustratively an incandescent lamp whose rays are partially directed toward an aperture 60 in rotary screen 56 by the cooperation of reflector 54 and lens 58. Rotary screen 56, periodically perforated about its periphery by apertures 60, is driven by a motor, not shown, causing beam 50 to periodically scan the partially reflecting mirror 62. Mirror 62 is positioned to reflect the scanning beam 50 towards the subject's pupil P. Housing 69 is designed as a protective cover and also serves to minimize spurious reflections, ambient radiation pick-up and the like. The subject's gaze and thus his optical axis is directed by a fixation object, not shown.

The subject's retina is by this arrangement scanned with incident radiant energy. This energy may be luminous or in the longer wavelengths, e.g., infra-red. The resultant diffusely reflected radiation from the retina passes out through the subject's pupil P. That portion of the reflected radiation illustrated in part by ray 66, which is transmitted through stop 64, energizes the photosensitive cells 68. The stop 64 functions as indicated heretofore and also serves to limit the measurement to preselected regions of the eye, e.g., particular meridians.

To provide for a convenient location of the punctum remotum, reference lens 70 may be employed. If a lens is not employed the system calibration must account for this and other reference dimensions. It is assumed for illustration that lens 70 in combination with an emmetropic eye places the punctum remotum approximately in the plane identified as P—R. The photosensitive cells 68 are positioned in the region of this plane.

In order that the photosensitive cells 68 be capable of evaluating the nature of the retinoscopic reflux, i.e., in order for them to be able to sense the apparent motion of the reflex, they should be used in conjunction with an image forming means so that they can discriminate among the rays emergent from different sections of the pupil. This can be done conveniently by imaging the pupil on the photocells such that one cell sees one section of the pupil, for example, the cell 68R "sees" section R′ of the pupil, while the other cell views a different section, for example, the cell 68L "sees" L′ of the pupil. Reference lens 71 may be used to realize this image forming function. The lens or a combination of lenses or other image forming means may be utilized depending on system dimensions, the desired size of the image cast on the photosensitive cells, and other factors.

With the photosensitive cells 68 now responsive to the reflex which occurs, it is necessary to utilize the photosensitive response so as to provide a useful indication which will serve as a measure of the refractive properties of the eye.

Referring back to FIG. 6, it is apparent that the photosensitive cells can have responses analogous to those labelled L and R in that figure. These responses would occur periodically as the pupil P was periodically scanned by the incident beam. The particular response depends on the refractive condition. In case A of FIG. 6, for example, the response of L leads the response of R and thus the output of cell L leads the output of cell R. At the point-of-reversal, case B in FIG. 6, the cell outputs would be coincident in time, the point-of-reversal being marked by simultaneous illumination of all sections of the pupil. In case C the output of cell R would lead the ouput of cell L.

In view of the foregoing actions, it is apparent that the eye can be characterized as hyperopic, emmetropic or myopic in accordance with the time relationship of the cell outputs.

It is thus desirable that evaluation of the cell responses on this basis be accomplished by some appropriate circuit connected to the cell outputs as shown in FIG. 7. The circuit has been designated the evaluator.

The evaluator of FIG. 7 may include any one of many well-known configurations which are used to compare the time relationships of impulses. The function of the evaluator is to provide indicia relating to the relative cell responses. It must therefor detect differences in the time of occurrence of the cell outputs and provide in turn an output related to the lead-lag time relationship between the cell responses. Thus, for example, when the L cell output leads the R cell output, the evaluator may actuate the plus indicator lamp in the indicator circuirt which is responsive to the evaluator. When both cells respond simultaneously, the evaluator actuates the point-of-reversal lamp, P.O.R. When cell L lags cell R the minus lamp is illuminated. In this way the relative refractive condition of the eye can be determined. A plus or minus power lens or lens combination can be used to actually obtain the point-of-reversal reflex. The lens or lens combination which is employed to reach the point-of-reversal may be used in substitution for, or in conjunction with, the lens 70. By noting the value of the lenses which result in a point-of-reversal reflex, one can determine the refractive condition of the eye. Each meridian of the eye may be measured by rotation of the optical apparatus of FIG. 7.

If a direct reading of the power of the subject's eye is desired without the use of correcting lenses, then the evaluator can include a timing circuit constructed and calibrated to measure the refractive condition in response to the time relationship between the photosensitive cell impulses. Such a reading may be displayed in any convenient manner, for example on meter 55.

The system of FIG. 7 is designed to illustrate the basic principle of objective refraction. It is somewhat simplified in form for this reason. The details concerning each element of the system together with some variations thereof will be described hereinafter.

*Lens Testing*

While the system of FIG. 7 has been described in terms of the testing of the eye, it is also adaptable to the testing of inanimate lenses.

Figure 8:
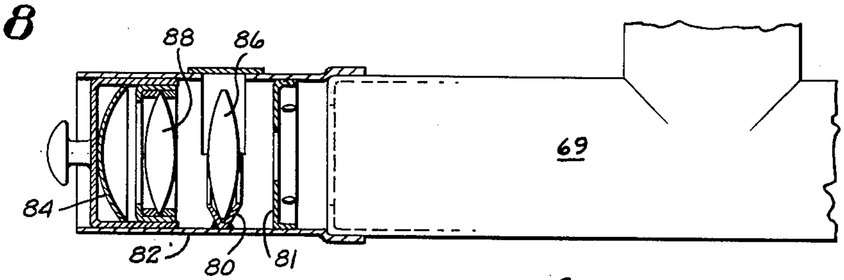
FIGURE 8 is a sectional view of an adapter for use with the apparatus of FIGURE 7.

For testing inorganic lenses, an adapter shown in FIG. 8 may be used in conjunction with the arrangement of FIG. 7. The adapter includes a lens mount 80, in which the lens or lens combination 86 is placed for test; also included are a housing 82, mask 81, and a reflector 84. The adapter is placed in the position occupied by eye S of FIG. 7 and is tested generally in the same manner, the exact test procedure being dependent upon the particular application.

For testing lenses in the process of manufacture, the indicator lamps or meter 55 of FIG. 7 may be referred to in order to determine whether and how much additional grinding or other treatment is necessary. To test each meridian, it is only necessary to rotate the adapter so that each desired meridian is checked.

Unlike the testing of the eye, the adapter of FIG. 8 may be controlled in several additional respects. The reflector 84 may be placed at any desired distance from the lens 86; a reference lens 88 may be employed to obtain the desired response; and the surface qualities of the reflector can be similarly adjusted to provide more or less diffuse reflection. The shape and dimensions of the scan can also be adjusted by means of mask 81, and if desirable the scanning incident beam can be placed behind the lens 86 thus eliminating the need for a reflector.

It is a relatively simple step to render the system somewhat automatic by making a lens grinder, coater, etc., responsive to the signals which actuate the indicator lamps and/or meter 55 of FIG. 7. The grinding or treating operation would then terminate upon the receipt of a point-of-reversal signal or a signal related to a particular refractive value. Such a system is disclosed in FIG. 9 where the refractor of FIG. 7 and the adapter of FIG. 8 are shown in combination with the grinding or treating apparatus. The subject lens 86 is shown in the test position. The test results, initially indicated by the reflex signals, are adapted to control the grinder by means of the evaluator. The evaluator transmits a refraction signal to the grinder and recorder control which indicates the nature and degree of the required grinding operation. In the grinding stage, subject lens 86 in mount 80 is positioned in the grinder by arm 89 which moves about pivot 90. Each meridian of the lens may be checked by rotating the lens relative to the direction of sweep or by changing the direction of sweep as described hereinafter.

Figure 9:
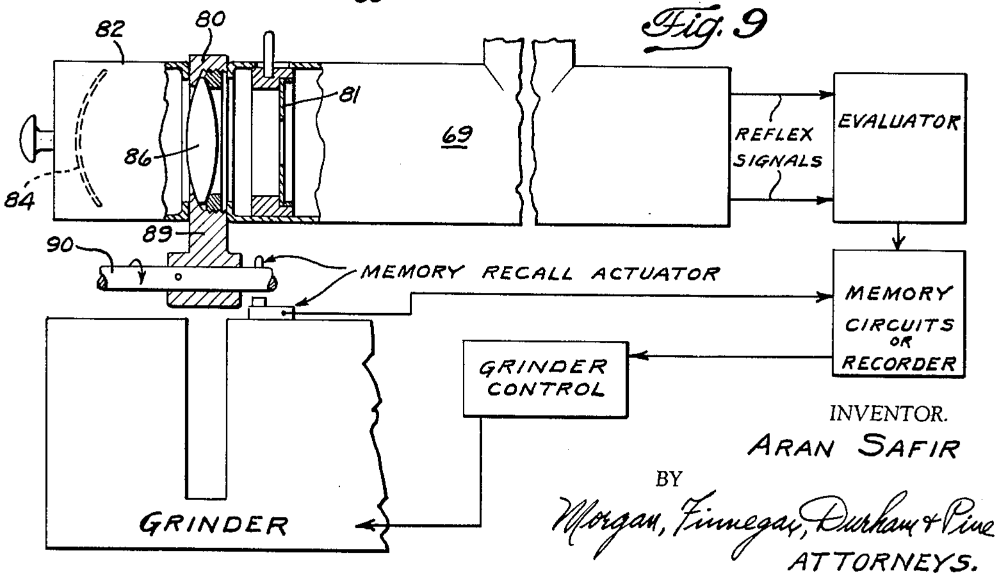
FIGURE 9 is a sectional and schematic view of one embodiment of the invention adapted to lens grinding and lens treating functions.

The apparatus of FIG. 9 will also serve admirably for production line testing of lenses as either a go no-go gauge or as an approximate quantitative checker.

In this application, lenses are checked by merely placing them in the lens mount 80 and observing the meter 55 or indicator lamps of FIG. 7. For the go no-go check, it is only necessary to have one indicator, either the P.O.R. lamp or one which signals lack of point-of-reversal. For approximate quantitative checks, the plus and minus indications are also relevant and are used to indicate the corrective actions, if any are desired, which are necessary. For automatic or semi-automatic operation, the lenses 86 may be fed into the adapter 82 via a chain whose links 80 serve as lens mounts or by a wheel with peripheral lens mounting holes bounded by supports 80. (A similar arrangement may be used in refracting the eye, to select various values of the lens 70, FIG. 7). In conjunction with the lens testing operation, or as a separate feature, the plus, minus, and point-of-reversal signals can be used to mark or dislodge either the satisfactory or the rejected lenses.

An appraisal of the structures illustrated in FIGURES 7, 8 and 9 should indicate many of the excellent features of the invention. High speed, automatic, and precise measurement may be made. In less time than it takes to blink, the subject's eye or a lens may be checked along one meridian. In a short interval thereafter a complete set of meridians can be evaluated. Thus the roving eye of a child or one suffering from nystagmus poses no problem, and the populations of entire communities can be refracted in a phenomenally short time. No special skill is required. In addition and particularly when infra-red radiation is used, there is an absolute minimum of disturbance; the subject's eye may be made to gaze at a luminous fixation target without causing interference with the refraction, thereby permitting refraction precisely along the visual axis. By virtue of its speed in both measurement and indication, the apparatus also serves precisely to evaluate dynamic changes in accommodation since the apparatus closely "tracks" the refractive condition. In grinding control and lens testing, rapid action of a degree not known heretofore is readily achieved.

Before proceeding to a description of a more comprehensive embodiment of the invention, some particular characteristics and variations of the elements of the basic system will be described.

*Scanning Technique*

It was noted that the incident radiant energy which is directed into the pupil is made to scan across the retina in a periodic motion. There are several methods for producing this motion, some of which are described below.

One scanning technique has been described and illustrated in FIG. 7. The use of the rotating shade 56 with apertures 60 is particularly suitable where reasonably high scanning rates are desirable.

For a shade with $m$ apertures and a rotary speed of $n$ revolutions per second, the number of sweeps per second, $s$, is given by $$s=nm$$

As a typical example, with a speed of 60 r.p.s. and 10 apertures, the sweep frequency is 600 sweeps per second. Sweep speeds in this range are desirable when consideration is given to measurement time and to the problem of power supply ripple. With this or a higher sweep frequency, extremely rapid evaluation of the reflex is attained. Also, it is relatively easy to construct an evaluator which will reject the power supply ripple and respond to the sweep frequency and harmonics thereof. It should be noted that with certain photosensitive cells the problem of rejecting ripple is important since for low radiation levels the signal-ripple ratio prevents effective discrimination.

Other embodiments for producing a periodic scan which follow generally the technique illustrated in FIG. 7 are shown in FIGS. 10 through 14.

Figure 10:
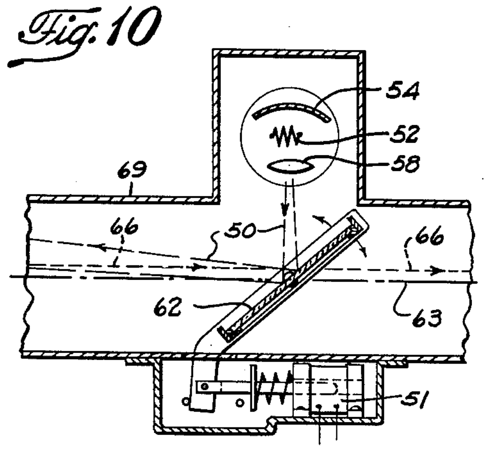
FIGURES 10 through 13 are schematic views of apparatus utilized to provide beam formation and deflection.
Figure 11:
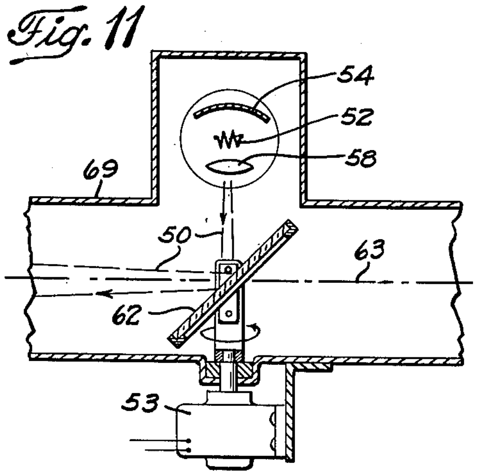

In FIGS. 10 and 11, the radiation source 52 is directed to mirror 62 with the aid of reflector 54 and lens 58. The reflector and lens are not essential of course and may be integral with the source 52. The mirror 62 is periodically displaced by solenoid 51 in FIG. 10 and motor 53 in FIG. 11. In FIG. 10 the solenoid 51 is periodically pulsed by a current which flows through the solenoid. This system produces a bi-direction scan, thus requiring circuits in the evaluator which are responsive to an alternating reflex or which effectively blank the scans in one direction.

In FIG. 11 unidirectional scan is obtained by driving the mirror 62 with motor 53. Both of the systems, FIGS. 10 and 11, have speed limitations which preclude very high scan rates. Moreover, the problem of spurious reflections is increased since the moving mirror tends to cast light in various directions about the apparatus. Further, the viewing of the reflex, as for example along axis 63, is made more difficult by virtue of the physical displacement of the mirrors about this axis.

While on the subject of scanning it should be noted that an electro-mechanical driver, e.g., a motor or solenoid, should be shielded and grounded to reduce the noise level in the photosensitive pick-up and in the case of certain photoemissive devices to prevent stray electric fields from impairing the operation of the photosensitive device. This latter effect is particularly significant if a photomultiplier is used.

Figure 12:
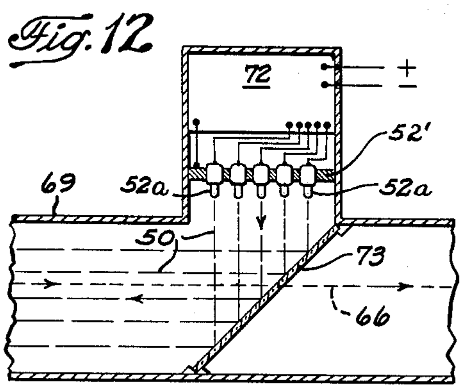
Figure 13:
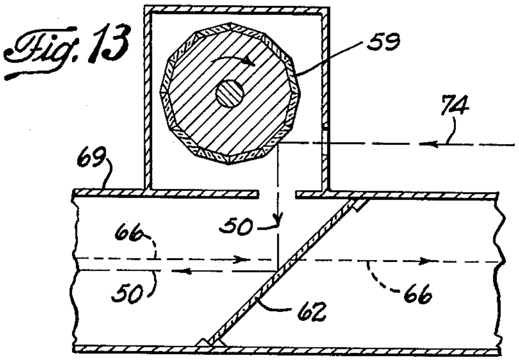
Figure 14:
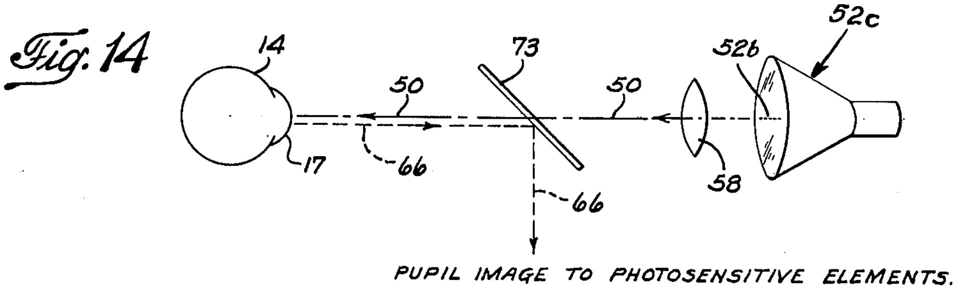
FIGURE 14 is a perspective and schematic drawing of apparatus utilized to provide beam formation and deflection.

Other embodiments for obtaining a scan are shown in FIGS. 12, 13 and 14.

In FIG. 12 a discontinuous scan, directed to the lens under test or the subject's eye via mirror 73, is achieved by use of multiple sources 52*a*, illustratively five in number, which are triggered in succession by electronic pulser 72. The pulser may be any one of many well known circuits and when used in conjunction with sources 52*a* of short time constant, e.g. gas tubes, can produce variable, high speed, scan rates.

Also capable of high speed ranges is the system of FIG. 13 wherein the radiant energy is directed and shaped into a beam 74 by elements not shown. The beam is made to scan mirror 62 by reflection from multifaceted reflector 59 which is driven by a motor, not shown.

In all of the systems described thus far, no means has been described for changing the angle of scan in order to measure refraction in different meridians. It is of course possible to rotate the entire optical apparatus relative to the subject's eye or the lens under test. Other methods include rotation of the shade 56 of FIG. 7, and the plate 52' of FIG. 12 which acts as a support for the lamps 52*a*. When the direction of scan changes, the orientation of the photosensitive elements 68, FIG. 7, must also change in synchronism with the direction of scan; alternatively, new groups of photosensitive elements, arranged in different meridians, may be employed.

One additional embodiment which provides a readily controlled sweep speed and variable direction of scan is shown in FIG. 14 wherein the radiant source comprises the lens 58 and cathode ray tube 52*c* the illuminated spot 52*b* of which may be made to sweep at any frequency in any direction by sweep control circuits well known to the electronic art. The advantage of excellent control of sweep provided by this circuit is partly offset by the additional circuitry which is required and by the relatively low illumination level provided by the cathode ray tube.

*Optical Components*

Certain characteristics of the optical components are determined solely by design considerations but some general observations are pertinent.

The mirror 62 of FIG. 7 has been described as the partially reflecting type. It is of course possible to use a reflecting mirror with an aperture, the latter providing a view of the reflex action by the photosensitive elements. The advantage of this arrangement resides in the low attenuation characteristic. However, the existence of the aperture complicates the reflex action since the aperture will produce a dark area within the illuminated retinal patch, the sharpness and degree of this dark area being dependent upon several factors including the position of the mirror relative to the punctum remotum. To avoid this complication and where an adequate illumination level exists, the use of a partially reflecting mirror is preferable.

The desired characteristics of the optical components will also depend upon the nature of the radiant energy spectrum which is initially controlled by the source. Since one of the salient features of the invention resides in the use of infra-red radiation and a concomitant mitigation of the disturbance of the subject, it is desirable in the infra-red mode to use a source which is rich in infra-red energy. Tungsten lamps are useful in this connection. The optical components, lens, mirror, etc., should have good infra-red transmission or reflection characteristics in accordance with their functions. The photosensitive elements should likewise be responsive to the infra-red region. Of course, operation in the visible spectrum is also contemplated with or without infra-red refraction. Radiation at shorter wave lengths is useful for particular lenses but not for ocular testing since the eye does not readily pass these wave lengths.

The problem of spurious reflections has been mentioned. One particular specular reflection is termed the corneal reflex and relates to reflection from the surfaces of the cornea. There are various ways of eliminating the effect of these reflections on the response of the photosensitive elements. One method involves placing the photosensitive elements at the extremity of the pupil image, away from the locus of the corneal reflex. Another method employs a combination of polarized filters which attenuate rays associated with the corneal reflex before they impinge on the photosensitive elements.

It was noted hereinbefore that the size of the stop, e.g. stop 64, FIGURE 7, is one of the factors which controls the size of the ophthalmoscopic field of vision, OFV. Illumination of any point of the OFV causes, as far as the photosensitive elements are concerned, total illumination of the subject's pupil or the lens under test. It follows therefore that as the size of the aperture decreases a smaller fraction of the total scan will provide total illumination. The size of the aperture in the stop also affects the nature of the reflex since it controls the amount of light incident on the photosensitive elements. Near the point-of-reversal, where the illumination is relatively high, a small aperture is satisfactory in providing precise control of the reflex. At positions considerably removed from the point-of-reversal it may be necessary to increase the aperture size to raise the over-all illumination level. This latter step may not be necessary when sufficiently intense radiation sources and high sensitivity photosensitive elements are used. In any event it has been found useful in practicing the invention to make the stop size variable to increase the flexibility of the apparatus.

It was noted hereinbefore that the dimensions of the beam incident on the subject's pupil as well as the position of the beam source relative to the subject's punctum remotum have an effect on the reflex action. If the beam is effectively located so as to correspond with the subject's punctum remotum then the source will be sharply imaged on the subject's retina or, in lens testing, on the reflector. The source under these conditions will then provide the retina with a sharply defined illuminated patch and the reflex action will have a correspondingly sharp characteristic involving the transition from total darkness to total illumination. If the incident beam is not sharply focused on the retina both the degree of illumination of the retina and the clarity of the reflex action will be reduced. It is thus desirable to shape and position the incident beam so that reasonable brilliance and clarity are insured. But since this condition is only obtained by knowing the location of the subject's punctum remotum it is necessary to design the beam-forming components so that they provide some optimum condition of illumination of the retina. Techniques for accomplishing this are well known to the art.

Suitable systems for providing proper illumination of the retina and a scanning thereof have been described and illustrated in FIGURES 10 through 14. Lens 58, reflector 54 and equivalent components serve to dimension the beam properly. The lens 58 and/or an aperture fitted to the lens may be varied to provide proper beam characteristics.

In designing the optical system, magnification of the pupil image which is cast on the photosensitive elements, may be desirable where the latter require a large image. This magnification can be readily accomplished with a lens system located in the general region of lens 71 of FIGURE 7. It may be desirable in this connection to render the system primarily responsive to elemental areas of the pupil, e.g., the central regions. This is accomplished by positioning the photosensitive elements in the region of interest of the pupil image.

*Photosensitive Elements*

There are a wide variety of photosensitive elements which will adequately serve the objects of the invention. Included in this group of elements are photo tubes, both gas and vacuum, photovoltaic cells, photomultipliers, photoconductive cells, phototransistors and other sem-conductors. Choice of a particular photosensitive device for a particular system configuration is principally a matter of design.

It has been found that in view of the general desirability of small pupil image, fast response time, good sensitivity, infra-red response and minimum support equipment requirements, certain photoconductive cells especially cadmium selenide and lead sulphide provide good performance although it is clear that the other above-mentioned components provide the necessary response when properly associated with the other system parameters: particularly radiation spectrum, radiation intensity and scan rate.

Two photosensitive elements were shown in the system of FIGURE 7 for responding to the reflex along one particular meridian. Actually more than two may be used for refraction along a single meridian. For example, a third element when placed in the center of the pupil image provides a third pulse which may serve as a synchronizing pulse or for rendering the system fail-safe or as a third index for timing or for providing a parameter related to intensity of illumination. Well known circuits e.g. digital circuits, can be utilized to exploit the pulse associated with this third photosensitive element for the purposes described.

It is also possible to utilize a single photosensitive element to provide the proper response for measurement of refraction as indicated hereinbefore. It is only necessary to shade asymmetrically the sensitive surface of the element, i.e. that surface which coincides with the pupil image, such that different responses will occur according to whether the reflex exhibits a "with," "against" or "point-of-reversal" characteristic. One convenient means for accomplishing this is to place an opaque screen in front of and to one side of the photosensitive surface, the screen overlapping one side of the sensitive surface, and having, for example, an arcuate border on the side of the screen closest to the center of the pupil image. With this arrangement the slope of the cell response curve will depend on the direction and rate of movement. The evaluator must then be designed to respond to the slope of the response curve. Such circuits are frequently used in the electronic art.

Figure 15:
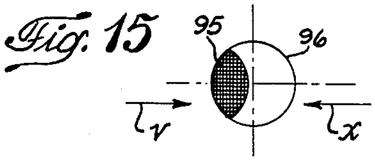
FIGURE 15 is an elevation view of a photo-sensitive surface.

A single photosensitive configuration constructed as described above is shown in FIGURE 15 wherein an opaque screen 95 masks a region of photosensitive surface 96. It is clear that a reflex moving in the direction indicated by arrow *v* will provide a response differently shaped from that associated with a reflex moving in the direction of arrow *x* while both of these responses will have shapes differing from the response related to the lack of movement associated with a point-of-reversal reflex.

It was suggested hereinbefore that in changing the meridian of refraction the photosensitive elements be physically rotated into the newly selected meridian. As an alternative a group of sensitive elements may be associated with each selected meridian. This latter arrangement eliminates the need for mechanical rotation of the photosensitive apparatus but creates other requirements.

With a set of photosensitive elements associated with each selected meridian it is desirable in order to avoid undue complexity in the evaluator, to switch the selected photo elements into the evaluator circuit and disable the others. This is readily accomplished, for example, by a rotary switch, the rotary contacts of which are connected to the evaluator and the stationary contacts of which complete circuits to the photosensitive elements.

*Evaluator*

The function and general character of the evaluator circuit has been described hereinbefore. Design of system details falls within the province of those skilled in the electronic computing and measuring art. However, by way of illustrating with further precision the refracting technique, exemplary embodiments of the evaluator will be described.

Figure 16:
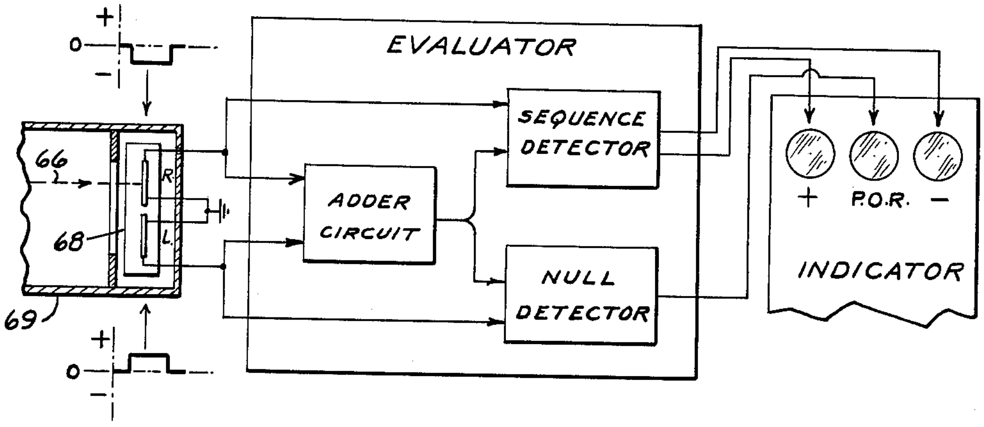
FIGURE 16 is a data flow diagram of one circuit of the Evaluator and Indicator.

In FIGURE 16 is shown the block diagram of an evaluator circuit which receives as inputs the electrical signals generated by the photo cells in response to the reflex action. These electrical signals are shown emanating from photo cell L and photo cell R in the diagram, and are symbolized by the pulses associated with each cell. These pulses are of opposite polarity to facilitate discrimination of one cell output with respect to the other. The pulses associated with each cell occur in a train at the scan rate of the optical system and are applied to an adder circuit. The adder circuit algebraically combines the signals and if necessary also provides amplification. It is clear that at the point-of-reversal the pulses generated by both cells will be coincident in time and since they are opposite in polarity the algebraic addition of them will produce a zero signal. Connected to the output of the adder circuit is a null detector which is responsive to this condition. When the null occurs this detector actuates an indicator lamp designated POR thus indicating that the point-of-reversal reflex is occurring.

It is also apparent that when the cell outputs are not coincident in time, which is the case for "with" and "against" reflexes, the output of the adder will provide a narrow negative pulse followed by a narrow positive pulse or vice versa according to whether the reflex is a "with" or "against" movement. Thus if the output of cell L leads the output of cell R the addition of the two signals will provide a positive pulse followed by a negative pulse. If conditions are reversed the output will be correspondingly reversed.

In order to convert these signal conditions into usable indications the adder output is also applied to a sequence detector which is responsive to the relative sequence of the negative and positive pulses appearing at the adder output. Circuits performing this function are well known to the art including, for example, phase detectors and various types of multivibrators. The sequence detector provides one of two outputs according to whether the negative pulse leads the positive pulse or vice versa. One output actuates a plus indicator lamp and the other actuates a minus indicator lamp. These lamps serve to indicate whether the power of the lens or eye under test is relatively positive or negative.

The circuit of FIGURE 16 is shown by way of example only. There are many variations and refinements possible. For example, the amplitude of the pulses which is related to the intensity of the illumination can serve as a variable to increase the accuracy of the computation, to synchronize, and to render the instrument fail-safe. In providing this latter feature, for example, the null detector can be rendered also responsive to the output of either of the cells in order that only that null associated with the point-of-reversal will cause actuation of the POR lamp. This arrangement prevents the occurrence of a POR indication when no reflex at all is received. For synchronization, which is sometimes required in sequence detectors, the output of either cell can also be fed to the sequence detector to serve as a reference. The previously described third photocell positioned in the center of the pupil image can provide outputs for synchronizing and for fail-safe purposes, also.

Figure 17:
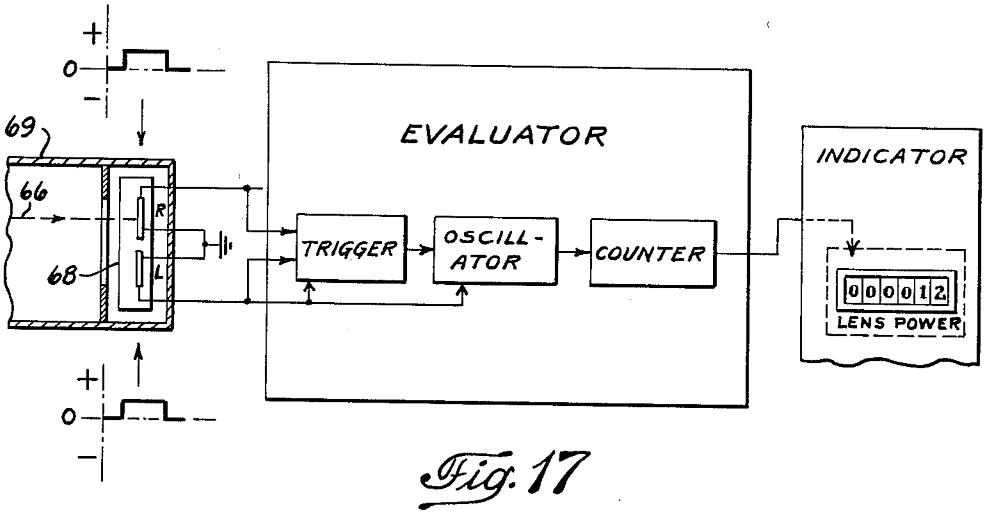
FIGURE 17 is a data flow diagram of another circuit of the Evaluator and Indicator.

In order to provide a direct reading of lens power or the power of the subject's eye the system of FIGURE 17 may be employed. This too is merely one example of many arrangements which will provide the desired function. As in the arrangement of FIGURE 16 the outputs of cell L and cell R are applied to the evaluator and comprise a train of pulses from each cell. Both cell outputs are shown to be positive pulses although it is feasible to have both pulses negative or to make the output of one cell positive and the other cell negative. This choice depends upon the nature of the trigger circuit to which the cell outputs are applied. This output of the trigger circuit is applied to an oscillator such that the leading input pulse to the trigger actuates the oscillator and the trailing input pulse to the trigger disables the oscillator. The oscillator therefore runs for a period of time which depends upon the time relationship between the photo cell pulses. The output of the oscillator is applied to a counter which converts the oscillator signal into suitable signals for actuating the lens power indicator. The counter, for example, may be of the binary type and its output may be applied to digital-responsive indicators in the lens power indicator. By this arrangement there appears at the lens power indicator an indication of lens power in terms of the time interval between the photo cell pulses. To provide the proper correlation between lens power and time interval, suitable calibrating and shaping circuits can be utilized in the trigger, oscillator or counter. To obtain the polarity of the lens power, the lens power indication may be correlated with the plus and minus indications provided in FIGURE 16. To provide a reference or synchronizing signal for the apparatus of FIGURE 17 the output of either cell may be applied to the trigger and/or oscillator. This output may also be obtained from the aforementioned third photosensitive cell.

With the circuits of FIGURES 16 and 17 it is possible to get continuous and rapid indications of the refractive condition of the subject's eye or lens combination under test. The indications may be used for measurement purposes and may also be used for control, as, for example, in the configuration of FIGURE 9. In addition to attaining the objectives described hereinbefore these systems also permit the excellent measurement of both the range and speed of accommodation. As the subject rapidly varies his accommodation from, say, some remote point to a near point, a corresponding change in the indications is observed in the apparatus of FIGURES 16 and 17. Timing of the interval from one extreme of accommodation to the other is readily accomplished by a timing circuit responsive to the output signals of FIGURE 16.

By virtue of the repetitive character of the reflex phenomena as generated by the repetitive scan, additional reliability is inherent in the evaluator circuit since the circuits may be readily adapted to sample a number of reflexes before an indication is provided. This insures against erroneous readings caused by transient movements of the subject's eye or test lens. The number of responses which are sampled can be reduced, however, if transient phenomena as described above are the objects of the test.

*System Configuration*

Figures 18, 19:
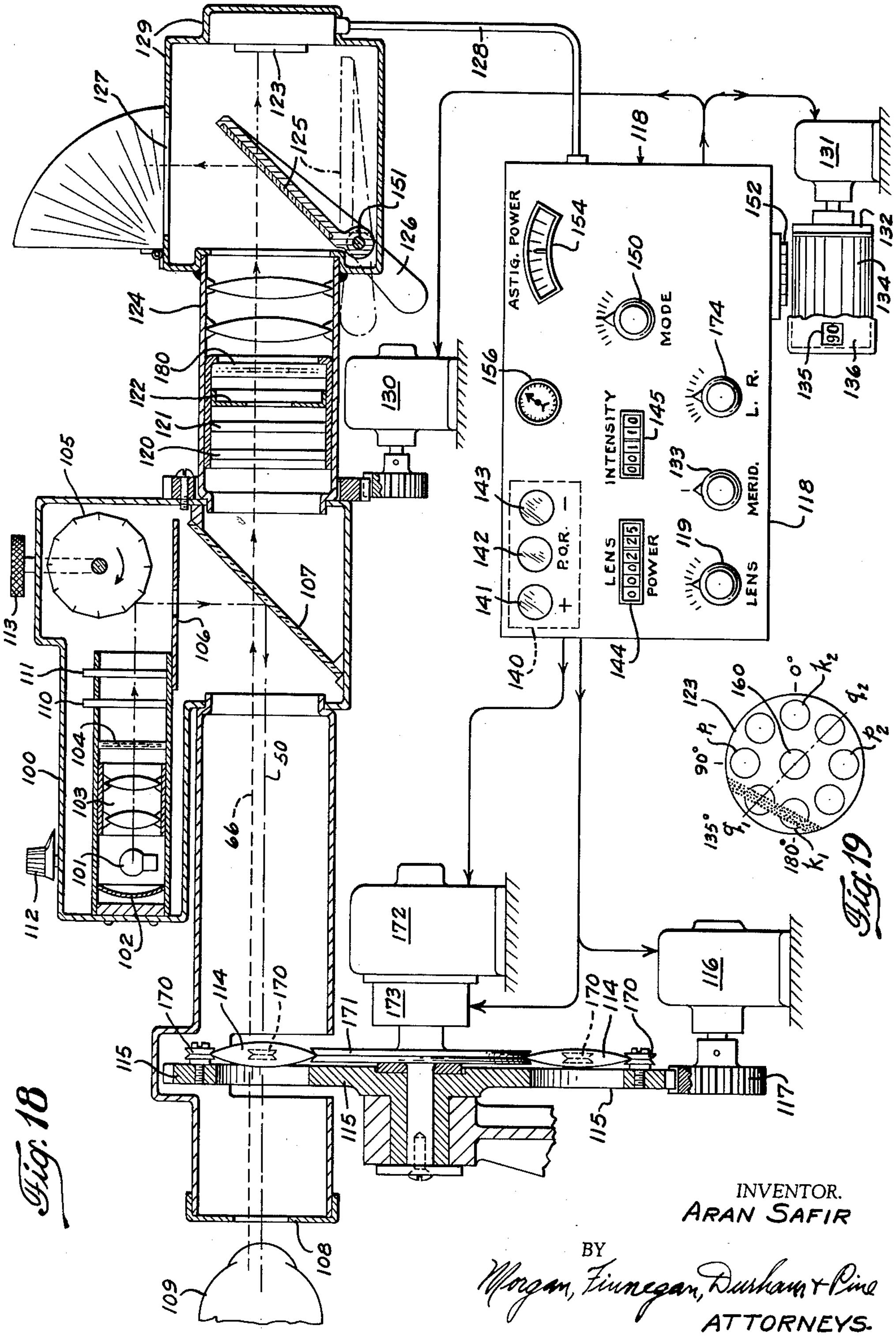
FIGURE 18 is a partly sectional and partly schematic illustration of a system embodiment of the invention.
FIGURE 19 is an elevation view of the photosensitive asesmbly of FIGURE 18.

A system embodying several features of the invention is shown in FIGURE 18. The system provides automatic refraction of the eye and when used in combination with the adapter of FIGURE 8 provides refractive measurement of lenses or lens combinations. It may also be used for automatic lens grinding control as illustrated in FIGURE 9 and described hereinbefore.

In FIGURE 18 there is shown an assembly 100 which houses the components used for forming the radiant beam. Radiant energy source 101 in combination with reflector 102, lens system 103, and aperture 104 provides a beam of radiant energy which is incident on rotating multifaced mirror 105. Motive means for driving the mirror 105 are not shown. The radiant energy beam thus formed is made to scan the subject's eye or lens under test through the cooperation of mirror 105, mask 106 and partially reflecting mirror 107. The radiant beam is directed through adjustable stop 108 and cast on the retina of the subject's eye 109. The beam of radiant energy is adjusted for optimum characteristics as described hereinbefore by adjustment of the aforementioned optical elements, including source 101, reflector 102, lens system 103 and aperture 104. In addition the spectral characteristics of the beam may be controlled by filter 110 which in the preferred mode of operation provides good infra red transmission. The polarity of the radiant beam is adjusted by polarizer 111. Also serving to control the spectral characteristics as well as the radiation intensity is a rheostat, not shown, which is adjustable by control 112 to vary the excitation of the radiation source 101.

Where manual operation of the multifaced mirror 105 is desired, a control 113 may be adjusted which, through a coupling, varies the rotary position of mirror 105, to permit manually controllable scan of the subject's eye or tested lens.

In order to modify the refractive properties of the subject's eye or tested lens there is inserted in the optical path a variable lens system comprising a series of lenses 114 mounted in a suitable holder, e.g., mounted around the periphery of a circular disc 115. The disc is positioned relative to the optical axes of the system such that rotation of the disc, as by drive means 116 and gear 117, places preselected lenses of differing powers between the radiant energy source and the subject's eye. Drive means 116 is controlled by a lens control circuit in the evaluator. Signals serving to actuate the lens control system emanate from the Evaluator-Indicator 118 and may occur automatically or be controlled manually as indicated hereinafter. Manual control may be exercised by operation of the lens control 119 such that selection of a particular lens value causes drive means 116 to actuate disc 115 until the desired lens 114 is placed in operative position in the optical system.

The lenses 114 of various powers in the variable lens system may include both spherical and cylindrical configurations. The axis of the cylindrical lenses may be rotated to any desired meridian by means of the cylinder axis control 174, located on the Evaluator-Indicator. This control actuates cylinder axis drive means 172 which rotates lens 114, mounted in grooved rollers 170, via clutch 173 and rotary disc 171. The disc 171 engages the lenses 114, only one of which is shown, to thereby position the cylinder axis in the desired meridian. Control of the cylindrical axis position is temporarily disabled during changes of variable lens 114 by means of clutch 173 which disengages drive means 172 from drive disc 171.

Rays of radiant energy associated with the reflex which results from scanning the subject's eye or lens under test pass through filter 120, polarizer 121, and mask 122 to the photosensitive assembly 123 via adjustable lens system 124 and adjustable aperture 180. Polarizer 121 serves in combination with polarizer 111 to miminize specular reflections. Filter 121 provides adjustment of the spectrum in cooperation with filter 111. Adjustable lens system 124 serves to image the pupil on the photosensitive assembly 123 and is adjusted to produce the desired image size. Mask 122 regulates the area of the pupil image and reflex which is to be monitored. The photosensitive assembly 123 is located within housing 129 which includes a mirror 125. Mirror control 126 provides a means for directly viewing the reflex. By operating control 126 the mirror is rotated about pivots 151 such that the reflex can be observed by opening a hatch 127 and looking down towards the mirror. When direct observation is not desired, control 126 is actuated to position the mirror in its retracted configuration out of the optical path. A similar configuration is found in single-lens reflex-type cameras.

The signals emanating from the photosensitive assembly 123 are coupled to the Evaluator-Indicator 118 by a cable and connector 128.

To adjust the meridian of refraction, drive means 130 is employed which rotates housing 100 about the optical axis. Drive means 130 changes the meridian of refraction in accordance with signals emanating from the Evaluator-Indicator 118. These signals may be generated manually by turning meridian control 133 or may occur automatically as described hereinafter.

For providing a record of the selected meridian there is also actuated by the meridian control signals, a drive means 131 which position drum 132. Located on drum 132 is chart 134. Each column of the chart corresponds to a particular meridian. Serving to identify the selective meridian is scale 135 suitably masked by shade 136 such that the selected meridian appears in the window of shade 136. The results of a test of a particular meridian are recorded in the appropriate column of chart 134 by marker 152 which stamps the test data in the appropriate meridian in response to the output of the evaluator circuit. For providing indications of the test there is also a lamp assembly 140 on which is mounted plus indicator 141, POR indicator 142, and minus indicator 143. For actual indication of measured lens power there is provided indicator 144 and to provide data related to the intensity of the reflex action there is provided indicator 145.

*Modes of Operation*

Several modes of operation, controlled, for example, by mode selector 150, are within the capacity of the system of FIGURE 18. In one mode of operation, which shall be designated variable lens mode, the subject's eye or lens under test is refracted by use of the variable lens control system including driving means 116 and lens combination 114.

In the variable lens mode the system variables are placed in some initial or reference position and the reflex associated with a particular meridian is sensed by photosensitive means 123. The latter transmits signals to the evaluator 118. As described hereinbefore the evaluator provides a signal which indicates the refractive condition. These signals are used to control the lens combination 114 via the lens control system. If a plus or minus refractive signal is generated in the evaluator, the lens control system is actuated causing the lens combination 114 to vary. Successive lenses 114 are positioned in the optical system until a point-of-reversal signal is received from the evaluator. At this time the lens control system is de-activated and driving means 116 stops operating. The power of the lens combination 114 which results in a point-of-reversal reflex, together with the system constants, provides the refractive power of the subject's eye or lens under test for the selected meridian. This result is portrayed on the lens power indicator 144 and may also be recorded on chart 134 by actuation of marker 152. Marker 152 provides the same data as is indicated on 144 or the equivalent data displayed in more useful form.

As an alternative method of obtaining the refractive error, the periphery of disc 115 may be suitably marked in correspondence with the power of each lens 114, the latter data being weighted or modified in accordance with system constants to provide direct indication of refractive power.

Upon completion of the refractive measurements along one particular meridian a new meridian is selected manually or automatically and the aforementioned cycle repeated. A new meridian is selected by actuating drive means 130 which actuates housing 100. In synchronism with this action, drum 132 is rotated to the new meridian of refraction.

In selecting a new meridian it is also required that the photosensitive elements be shifted to the new position or in the alternative and preferred manner a new set of photosensitive elements be actuated by suitable switching circuits not shown. Referring for a moment to FIGURE 19 an appropriate cell arrangement can be seen. If, for example, refraction has been completed along meridian 180°, the system can be actuated to refract along a new meridian, e.g., 135° at which time photosensitive elements $q^1$ and $q^2$ are switched into the evaluator circuit. Only four axes are shown but a greater number are within the contemplation of the invention.

The refractive measurement is completed when refraction along all the desired meridians is accomplished. The total results may be suitably recorded on chart 134. The data thus obtained provides an indication of spherical and sphero cylindrical errors thus disclosing astigmatic conditions and also indicating the astigmatic axes of maximum and minimum power.

Several variations of the above described mode of operation are possible. The variable lens combination 114 may be adjusted manually by lens control 119 in conjunction with observation of the indicator lamps 140 or by direct observation of the reflex as seen via mirror 125 viewed through hatch 127. Similarly, the selection of a meridian may be accomplished manually via meridian control 133, the selected meridian, being observed through the aperture in shade 136. Refraction under various spectral conditions can be accomplished by suitable choice of filters 111 and/or 121. Additional useful data related to the intensity of the reflex may be obtained by observing indicator 145 and this indication may be correlated with the above described indications. In some cases it is desired to scan the subject's eye or lens under test directly without intervening lenses. This is accomplished by rotating rotary disc 115 to a position where no lens is interposed in the optical system. It may also be desirable in certain tests to automatically or manually adjust the apertures 106, 108 and 122, individually or in combination to vary the characteristics of the reflex in accordance with the output signals of the evaluator.

In the above described variable lens mode, spherical, cylindrical or spherocylindrical lenses 114 may be positioned in the optical path to modify the reflex. It is thus possible for example, to position a combined cylindrical and spherical lens 114 in the operative position and adjust the cylinder axis by control 174 to nullify astigmatic errors such that the point-of-reversal reflex or some other constant reflex persists in all meridians.

An additional mode of operation which shall be designated the direct measurement mode involves the direct measurement of refractive conditions along preselected meridians without utilizing the variable lens control system and related components. In this mode of operation a single working lens 114 (or no lens) is utilized and direct calculation of refractive errors is accomplished with the indicator providing evaluation of the time interval between cell outputs. The measured refractive condition is displayed on indicator 144 and may also be recorded on chart 134 in the manner described hereinbefore. Automatic or manual adjustment of the system components, e.g. lenses and apertures may also be performed in this mode of operation.

An additional mode of operation which is particularly appropriate where large astigmatic errors exist involves the use of more than one pair of photosensitive elements. In this mode of operation the eye is scanned along one meridian, e.g. the 180° meridian shown in FIGURE 19. With significant astigmatic errors the resultant reflex may have components of motion in other meridians. The resultant motion may be sensed, for example, in terms of its rectangular coordinate motions e.g. motions along the 90° and 180° meridians. These component motions may be sensed by the photosensitive cell pairs P and K. The signals produced by these cells are coupled to the evaluator circuit which calculates the resultant refractive conditions and indicates the spherical and cylindrical errors as well as the astigmatic axes. To make sure that the astigmatic error, if any, is detected, a plurality of meridians is scanned, two of the meridians being other than 90° apart to obviate the possibility of scanning only the principal axes. The spherical error may be displayed on indicator 144 and the cylindrical error on indicator 154. The astigmatic axes are shown on indicator 156. The results may also be recorded on chart 134 as indicated hereinbefore.

One satisfactory method of detecting astigmatic errors according to the above technique is to scan the subject's pupil with a radiant beam of narrow rectangular configuration. An exemplary reflex to this scan is shown by the hatched area in FIGURE 19. The direction of reflex is, for example, along the 180° meridian from cell $k_1$ to $k_2$.

The incident beam is vertical, its dimensions being established by the aforementioned optical components including the mask 106. Due to the astigmatic condition the reflex beam appears displaced angularly from the vertical as shown in FIGURE 19. This angular displacement is detected by the cells $p_1$ and $p_2$; in the example shown cell $p_1$ is energized before cell $p_2$ by a time interval which depends on the angular deviation. The presence of a time interval between the pulses from $p_1$ and $p_2$ immediately signals the existence of astigmatism. The time relationship between the outputs of cells $k_1$ and $k_2$ are evaluated to determine the power along the 180° meridian. The time relationships between the outputs of cells $p_1$ and $p_2$ are evaluated to determine the power along the 90° meridian. Measurement of these time intervals by circuits in the evaluator provides data descriptive of the astigmatic error. The astigmatic axes can be identified by scanning the meridians wherein no angular deviation of the reflex occurs.

Figure 20:
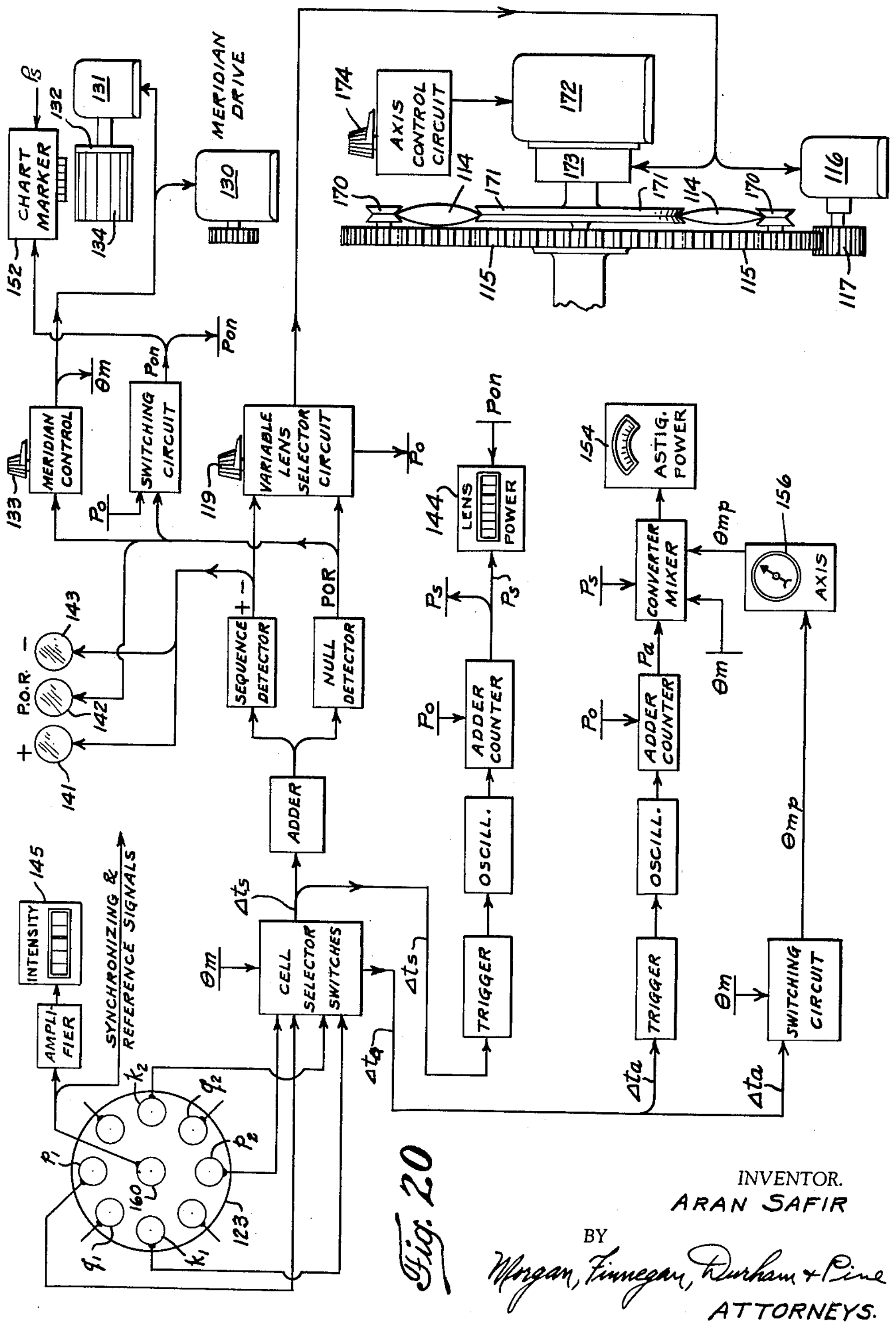
FIGURE 20 is a system data flow diagram of the apparatus of FIGURES 18 and 19.

By way of illustrating the modes of operation described above with respect to the apparatus of FIGS. 18 and 19 and in order to describe an exemplary evaluator structure, reference may be had to the data flow diagram of FIGURE 20.

Serving as principal inputs to the evaluator circuit are the outputs from the pairs of photosensitive elements illustrated in FIGURES 19 and 20. These include the cell pairs $p_1$ and $p_2$, $q_1$ and $q_2$ and similar sets associated with each meridian. Also shown located in the center of the pupil image in FIGURE 19 is a photosensitive cell 160. This cell may be used as shown in FIGURE 20 as a source of synchronizing signals and reference signals since it will provide an output each time a reflex occurs; this output may thus serve as the basic timing pulse.

Intensity indications as displayed on indicator 145 are received from an amplifier which is also energized by cell 160. To eliminate background illumination and other spurious interferences, the bandpass of this combination may be arranged to reject all but the signal frequencies. It is, of course, entirely possible to utilize any one of the cells $p_1$, $p_2$ and the like, instead of cell 160.

Considering again the primary inputs i.e. the various cell pair outputs, it is seen in FIGURE 20 that these outputs are applied to a cell selector switch circuit. The function of the switches in this circuit is to select those pairs of cells which relates to the meridian under test and to connect the outputs of these cells to various components of the evaluator circuit. The cell selector switches may include any convenient electronic or electro-mechanical configuration which provides this function by mechanical or electronic switching.

The switches, as shown in FIGURE 20, are actuated by meridian data, $\theta m$, derived from the meridian control circuit. As a new meridian is selected, a corresponding cell pair is connected to the evaluator circuit. The meridian signal, $\theta m$, may conveniently be in the form of a vector voltage which actuates a rotary synchronous receiver in the cell selector, the receiver shaft providing mechanical switching action which is applied to a rotary switch. Alternatively, rotary solenoids may be employed.

The output signals corresponding to the scanned meridian are designated $\Delta t_s$. These outputs are applied to a circuit which includes an adder, sequence (or phase) detector, and null detector. It can be seen that this circuit is similar to the one previously described and illustrated in FIGURE 16 and may be of the digital class of computing components. The circuit actuates the appropriate indicator lamp in the indicator assembly 140, in accordance with the nature of the reflex action. When the point-of-reversal reflex occurs this circuit also provides an output to the meridian control circuit to effect selection of a new meridian. The meridian control circuit thereby actuates the meridian drive means 130, the chart drive 131, and also provides the new signal $\theta m$, which identifies the newly selected meridian. This signal has already been described in connection with the cell selector switches and may conveniently be a vector voltage the vector angle of which corresponds to the selected meridian.

The meridian control circuit may be any convenient switching and actuating circuit, for example, a combination of rotary solenoids and a synchronous transmitter. The synchronous transmitter provides the aforementioned meridian vector voltage as well as driving signals for the meridian drive 130, and chart drive 131. These latter two elements may conveniently be synchronous receivers. The synchronous transmitter may be actuated either manually by meridian control 133, or automatically by the POR signal, the latter causing the transmitter to assume a new meridian under the action, for example, of a rotary solenoid which is pulsed by the POR signal.

Returning again to the selected cell outputs, $\Delta t_s$, it is seen that a circuit comprising a trigger, oscillator and adder-counter is actuated by these signals. This circuit generally corresponds to the circuit described and illustrated in FIGURE 17. The function of this circuit is to provide a signal related to the speed of the reflex action as reflected in the time interval between pulses thus providing an indication of the refractive condition of each meridian. To obtain this data it is necessary to provide the circuit with additional data descriptive of the value of the lenses 114, which modify the subject's eye or lens under test. This data in the form of a signal P*o*, derived from a variable lens selector circuit, is combined with the speed data in the adder-counter which may be any one of many circuits capable of performing this function. The adder, for example, may be of the binary type, receiving a binary signal from the counter and a binary signal from the variable lens selector circuit. The variable lens data P*o* and basic speed data thus may be combined to provide a digital signal describing the refractive condition of the subject's lens. This signal, designated P*s*, is applied to indicator 144 and is also used in other circuits as described hereinafter.

Also shown in FIGURE 20 is the just-mentioned variable lens selector circuit and a lens drive means 116; the latter serves to position selected lenses 114, of various values in the optical system. This circuit may be controlled manually as by lens control 119, such that adjustment of the lens control to a specific lens power causes lens drive 116 to rotate disc 115, thereby placing the desired lens in the operative position. The components for performing this function may conveniently be combinations of a synchronous transmitter positioned by the lens control and a synchronous receiver embodied in the lens drive 116.

During the period that the lens drive mechanism is moving to a new meridian a clutch 173 is actuated by an appropriate signal in the lens selector circuit. This clutch disengages cylinder axis drive means 172 from the variable lens assembly 115. During other periods of time the position of the axis of cylindrical lenses located in the disc 115 may be changed under the control of cylinder control 174, which actuates an axis control circuit. This circuit like the meridian control and cell selector circuits may be any one of well known electronic and/or electro-mechanical devices which provide remote position control and thus may be a combination of synchronous transmitter, actuated by control 174, and synchronous receiver embodied in cylinder axis drive 172.

For automatic control of the variable lens selector system there is applied to the lens selector circuit, signals related to the type of reflex. If, for example, a plus-power or minus-power signal is applied to this circuit the lens drive is actuated, the actuation continuing until the point-of-reversal reflex occurs as established by the existence of a POR signal. This latter control function is readily accomplished by suitable circuits which drive, for example, the synchronous transmitter in the selector circuit. Actuating and disabling a motor by the reflex signals such that the motor drives the transmitter shaft is a convenient way of accomplishing the desired result.

Corresponding to the value of that lens 114 which is in the operative position is the variable lens value signal P*o* which is applied to the adder-counter in the lens power circuit as described above. This signal may be obtained from a shaft-to-digital converter coupled to the transmitter or by any component which provides a similar response.

In addition to using the signal P*s*, the variable lens value P*o* may be employed as noted hereinbefore as the indicator of refractive condition. Thus the value of the lens 114 which results in a point-of-reversal reflex will, in conjunction with system constants, indicate the refractive condition of the subject's eye or lens under test. This function may be achieved by a simple switching circuit which receives the signal P*o* corresponding to each lens 114 but only transmits that P*o* signal, P*on*, which corresponds with the POR signal. The switching circuit may thus conveniently comprise a relay energized by the POR signal with the contacts of the relay completing a circuit from input to output when the relay is energized. The neutralizing lens power signal P*on* can be applied to the indicator 144 and to the chart marker 152, alternatively to the equivalent use of the signal P*s*.

In order to provide effective evaluation of astigmatic errors there is incorporated in the apparatus of FIGURE 20 additional components which serve to indicate this error as, for example, on indicator 154; the astigmatic axis may also be shown, for example, on indicator 156. The circuits for performing this function are primarily energized by signals from the cell selector switches. One signal designated $\Delta t_a$ is received from the cell pair which lies in the meridian normal to the scanned meridian. This signal is ultimately combined with the signal P*s* associated with the scanned meridian. It is possible of course to utilize the cells of different pairs of meridians than the scanned and normal meridian. For measuring the time interval between pulses in the normal meridian there is shown the combination of a trigger, oscillator and adder-counter. This combination is similar to the circuit which derives the power indicator 144. The output of this combination represents the time interval between pulses derived from the transverse pair of photosensitive cells as modified by the value of the variable lens 114 reflected in the signal P*o*. If the time interval in the transverse pair is zero either there is no astigmatic error or the principal meridian is being scanned. The net output, P*a*, from the adder-counter, is combined in a converter-mixer circuit with data which represents the time interval associated with the scanned axis and with data which represents the relationship between the principal axis $\theta mp$ and the scanned meridian, $\theta m$. The signals $\theta m$ and $\theta mp$ may be conveniently in the form of vector voltages which are vectorally combined by means well known to the art. The resultant signal may be converted by a shaft-to-digital converter and thence combined with the signals P*s* and P*a* derived from the respective adder-counters. The net result is applied to the indicator 154.

To obtain the principal axis data there is shown a switching circuit which receives the meridian signal $\theta m$ and the signal $\Delta t_a$ representing reflex speed along the normal axis. This switching circuit functions to connect the meridian signal O*m* to the output only when the cells in the normal meridian indicate that there is no angular deviation of the reflex. This condition obtains when the scanned meridian corresponds with either of the principal axes. It is thus seen that the meridian signal becomes the principal axis signal $\theta mp$ only when there is no apparent time interval between the cell outputs in the normal meridian. The signal $\theta mp$ conveniently in the form of a 3-phase vector voltage, actuates indicator 156 on which is displayed one or both principal axes. For most cases these axes can be assumed to be displaced by 90°. The indicator 156 may embody a synchronous receiver or equivalent component and may also serve as the source of signal $\theta mp$ for application to the aforementioned converter-mixer. The switching circuit for obtaining principal axis data may conveniently include a vacuum tube or equivalent which is cut off except when the proper $\Delta t_a$ signal is received.

The aforementioned specific examples are not intended to limit the scope of the invention. They are merely provided to illustrate the principles of the invention and to enable one to construct one useful form for practicing the invention. Details such as mode-switching arrangements, calibration, synchronization and the like, are left to those skilled in the art who deal with such problems continuously and in a routine manner. Since there is great latitude today in the selection of components, there being a vast source of equivalents, no atttempt is made to cover alternate, functionally equivalent, components. It should also be obvious that alternate means for generating, combining and displaying the system variables exist, these means having varying advantages associated with performance, cost, complexity and reliability.

The invention in its broader aspects is thus not limited to the specific combinations, improvements and instrumentalities described, but departures may be made therefrom within the scope of the accompanying claims without departing from the principles of the invention and without sacrificing its chief advantages.

In the accompanying claims the term "optical system" shall include single and combination lenses, both organic and inorganic. Where the lens system does not have a reflector, e.g. one comparable to the fundus of the eye, the term shall include such a reflector. The term "illuminate" is applied in its broad sense and includes irradiation by energy outside of the visible spectrum.

What is claimed is:

1. Apparatus for objectively testing an optical system comprising cyclical illuminating and scanning means operable to illuminate and scan said optical system with radiant energy along an axis lateral to the optical axis of said system, photoelectric means responsive to the direction of movement of resultant laterally moving radiant energy emergent from and refracted by said optical system, translating means responsive to said photoelectric means, said translatng means providing indicia related to the refractive condition of said optical system.

2. Apparatus for objectively testing an optical system comprising illuminating and scanning means periodically operable to lilluminate and scan said optical system with radiant energy along an axis lateral to the optical axis of said system, photoelectric means responsive to the direction of motion of the resultant laterally moving radiant energy emergent from and refracted by said optical system, translating means responsive to said photoelectric means, said translating means providing indicia related to the refractive condition of said optical system.

3. Apparatus for objectively testing an optical system comprising variable refractive means operable to modify the refractive properties of said optical system, means operable to selectively and periodically scan said optical system with radiant energy along an axis lateral to the optical axis of said system, photoelectric means responsive to the direction of movement of the laterally moving radiant energy emergent from and refracted by said optical system, translating means responsive to said photoelectric means, said translating means providing indicia related to the refractive condition of said optical system.

4. Apparatus for objectively testing an optical system comprising illuminating means operable to selectively and periodically illuminate said optical system with radiant energy along an axis lateral to the optical axis of said system, photoelectric means responsive to the direction of motion of the laterally moving radiant energy emergent from and refracted by said optical system, translating means responsive to said photoelectric means, said translating means providing indicia related to the refractive condition of said optical system, and meridian control means coupled to said illuminating means for selectively changing the meridian of said optical system which is illuminated by said illuminating means to thereby provide for the testing of a plurality of meridians of said optical system.

5. Apparatus for objectively testing an optical system comprising cyclical illuminating means operable to selectively illuminate said optical system with radiant energy along an axis lateral to the optical axis of said system, photoelectric means responsive to the direction of motion of the laterally moving radiant energy emergent from and refracted by said optical system, evaluating means responsive to said photoelectric means and providing data related to the rafractive condition of said optical system, and meridian control means responsive to said evaluating means and coupled to said illuminating means for selectively changing the illuminated meridian of said optical system.

6. Apparatus for objectively testing an optical system, said apparatus comprising variable refractive means operable to modify the refractive properties of said optical system, means operable to scan said optical system with radiant energy laterally of the optical axis thereof, photoelectric means responsive to the velocity of laterally moving radiant energy emergent from and refracted by said optical system, control means responsive to signals related to the output of said photoelectric means, said control means being operable to vary said variable refractive means until a predetermined refractive condition occurs, and meridian control means responsive to signals related to said photoelectric means and operable to vary the meridian of said optical system which is scanned by said illuminating means and thereby provide for the testing of a plurality of meridians of said optical system.

7. Apparatus for objectively testing an optical system, said apparatus comprising variable refractive means operable to modify the refractive properties of said optical system, illuminating means operable to periodically scan said optical system with radiant energy laterally of the optical axis thereof, photoelectric means responsive to the velocity of the resultant laterally moving radiant energy emergent from and refracted by said optical system, electrical evaluating means responsive to the output of said photoelectric means, indicating means responsive to the output of said electrical evaluating means, said indicating means providing indicia related to the refractive conditions of said optical system, control means responsive to said evaluating means, said control means being operable to vary said variable refractive means until a predetermined refractive condition occurs, meridian control means responsive to said electrical evaluating means and being operable to vary the meridian of said optical system which is scanned by said illuminating means to thereby provide for the testing of a plurality of meridians of said optical system.

8. Apparatus for objectively testing an optical system having an optical axis comprising illuminating means operable to periodically and laterally scan said optical system with radiant energy along an axis lateral to said optical axis, image defining means responsive to the resultant laterally moving radiant energy emergent from and refracted by said optical system for defining the lateral orientation of said emergent radiant energy, a plurality of photo-sensitive elements responsive to directional changes in the lateral orientation defined by said image defining means, evaluating means responsive to said photo-sensitive elements and including electrical means for comparing the outputs of said photo-sensitive elements, and indicating means responsive to the output of said evaluating means, said indicating means providing indicia related to the refractive condition of said optical system.

9. Apparatus for objectively testing an optical system comprising beam generating means for producing a beam of radiant energy, said radiant energy being operable to illuminate said optical system, scanning means coupled to said beam generating means and operable to cause said beam of radiant energy to periodically scan said optical system along an axis lateral to the optical axis of said system, image defining means located to intercept the resultant laterally moving radiant energy emergent from and refracted by said optical system, a plurality of photo-sensitive elements each selectively responsive to a particular region of said image defining means, evaluating means responsive to the output of said photo-sensitive elements and including electrical means for comparing the outputs of said photo-sensitive elements, and indicating means responsive to the output of said evaluating means, said indicating means providing indicia related to the refractive condition of said optical system.

10. Apparatus for objectively testing an optical system comprising variable refractive means operable to modify the refractive properties of said optical system, beam generating means for producing a beam of radiant energy, said radiant energy being operable to illuminate said optical system, scanning means coupled to said beam generating means and operable to cause said beam of radiant energy to periodically scan said optical system, image defining means located to intercept the resultant radiant energy emergent from said optical system, a plurality of photo-sensitive elements responsive to the direction of motion of radiant energy presented by said image defining means, evaluating means responsive to said photo-sensitive elements and including electrical means for comparing the outputs of said photo-sensitive elements and for determining the time relationships among said outputs, control means responsive to signals related to the output of photo-sensitive means, said control means being operable to vary said variable refractive means until a predetermined refractive condition occurs, and meridian control means responsive to signals related to said photo-sensitive elements and associated with said beam generating and scanning means to selectively vary the meridian of said optical system which is scanned by radiant energy.

11. Apparatus for objectively testing an optical system comprising illuminating means which include a source of radiant energy, intensity control means for controlling the intensity of said radiant energy, filtering means for controlling the wavelength of said radiant energy, polarization means for controlling the polarity of the electromagnetic waves of said radiant energy, optical adjusting means for adjusting the propagation pattern of said source of radiant energy, beam positioning means for controlling the spacial position of the beam of radiant energy, driving means for actuating said positioning means, the aforesaid components of said illuminating means being interrelated and cooperating as aforesaid to provide an incident beam of radiant energy having adjustable spectral characteristics and to direct said beam to impinge on said optical system and to scan said optical system along a predetermined axis at a controllable rate and scan width; variable refractive means comprising a lens system of variable power, said lens system being positioned to cooperate with said optical system and to modify the refractive properties of said optical system, refractive control means, said control means being coupled to said variable refractive means to vary and control the refractive properties of said variable refractive means, refractive indication means responsive to said refractive control means and adapted to provide indicia related to the refractive properties of said variable refractive means, image defining means adapted to define the direction of movement of the resultant radiant energy emergent from said optical system, a plurality of photoelectric elements responsive to the emergent radiant energy, evaluation means responsive to the output of said photoelectric means, said evaluation means providing an output indicative of the combined refractive condition of said optical system and said variable refractive means, said output also automatically controlling in mode of operation the aforesaid refractive control means, monitoring means, said monitoring means providing, for the observer, an indication of the refractive condition of said optical system, said monitoring means being responsive to said evaluation means, the aforesaid components being interrelated and cooperating as aforesaid to cause, in the automatic mode of operation, the automatic adjustment of said variable refractive means in the proper direction and degree, under the control of said refractive control means and in response to the behavior of the said emergent ray as sensed by said photoelectric means and evaluated by said evaluation means until said variable refractive means together with said optical system are in a predetermined refractive condition; meridian control means coupled to said illuminating means and adapted to change the axis of refraction of said optical system and responsive in the automatic mode of operation to said evaluation means to thereby change the axis of refraction upon completion of the testing of a preceding axis of refraction; meridian indication means responsive to said meridian control means and providing indicia related to the axis of refraction; recording means responsive to said meridian indication means, to said refraction indication means and to said evaluation means to provide a record of the test as reflected in the correlation between the axes of refraction and the adjusted power of said variable refraction means associated with each of said axes, all of the aforesaid components, in addition to being conjointly operable in an automatic sequence, being capable of manual operation by manual adjustment thereof.

References Cited in the file of this patent

UNITED STATES PATENTS

| | | |
|---|---|---|
| 2,049,222 | Reason | July 28, 1936 |
| 2,164,576 | Collins | July 4, 1939 |
| 2,304,814 | Glasser | Dec. 15, 1942 |
| 2,352,179 | Bodsey | June 27, 1944 |
| 2,643,457 | Skalka | June 30, 1953 |
| 2,773,413 | Schade | Dec. 11, 1956 |
| 2,803,995 | Gunter et al. | Aug. 27, 1957 |
| 2,807,976 | Vossberg | Oct. 1, 1957 |
| 2,873,378 | Le Poole | Feb. 10, 1959 |
| 2,922,351 | Hering | Jan. 26, 1960 |
| 2,966,091 | Goldberg | Dec. 27, 1960 |

OTHER REFERENCES

Thorington: Refraction and How to Refract, Second Edition, 1900, published by P. Blakiston's Son & Co., pp. 157–165.

A.O. Electronic Measuring Device, articles in Manufacturing Optician magazine, vol. 11, issue 9 (June 1958). Pages 446–448.